(12) United States Patent
Olivier et al.

(10) Patent No.: US 11,351,675 B2
(45) Date of Patent: Jun. 7, 2022

(54) ROBOTIC END-EFFECTOR HAVING DYNAMIC STIFFENING ELEMENTS FOR CONFORMING OBJECT INTERACTION

(71) Applicant: Sarcos Corp., Salt Lake City, UT (US)

(72) Inventors: Marc X. Olivier, Salt Lake City, UT (US); Fraser M. Smith, Salt Lake City, UT (US)

(73) Assignee: Sarcos Corp., Salt Lake City, UT (US)

( * ) Notice: Subject to any disclaimer, the term of this patent is extended or adjusted under 35 U.S.C. 154(b) by 84 days.

(21) Appl. No.: 16/237,615

(22) Filed: Dec. 31, 2018

(65) Prior Publication Data

US 2020/0206948 A1 Jul. 2, 2020

(51) Int. Cl.
  *B25J 15/00* (2006.01)
  *B25J 15/10* (2006.01)
(52) U.S. Cl.
  CPC ....... *B25J 15/0009* (2013.01); *B25J 15/0023* (2013.01); *B25J 15/10* (2013.01)
(58) Field of Classification Search
  CPC .......... B25J 15/0004; B25J 15/0009; B25J 15/0023; B25J 15/0206; B25J 15/10; B25J 15/103; B25J 15/12; Y10S 901/36; Y10S 901/39
  USPC ...................................................... 294/86.4
  See application file for complete search history.

(56) References Cited

U.S. PATENT DOCUMENTS

| | | | |
|---|---|---|---|
| 1,880,138 A | 9/1932 | Franz | |
| 2,850,189 A | 9/1958 | Leroy | |
| 2,981,198 A | 4/1961 | Nettel | |
| 3,171,549 A | 3/1965 | Orloff | |
| 3,280,991 A | 10/1966 | Melton et al. | |
| 3,306,646 A | 2/1967 | Flora, Jr. | |
| 3,358,678 A | 12/1967 | Kulstar | |

(Continued)

FOREIGN PATENT DOCUMENTS

| | | |
|---|---|---|
| CN | 101214653 A | 7/2008 |
| CN | 103610524 A | 3/2014 |

(Continued)

OTHER PUBLICATIONS

Aghili et al., Sensing the torque in a robot's joints, www.memagazine.org/backissues/september98/features/torque/torque.html, 1998, pp. 1-9, The American Society of Mechanical Engineers.

(Continued)

*Primary Examiner* — Dean J Kramer (57) ABSTRACT

A robotic end-effector to provide conformal object interaction. The end-effector has at least one finger with an inner portion or engaging side and one or more degrees of freedom. A jamming conformal pad is on the inner portion of the at least one finger. The jamming conformal pad has a compliant configuration in which the jamming conformal pad is compliant and configured to distribute across a surface of an object and, if contoured, infiltrate into any variations (e.g., indentations) in the surface, defining a conformal engaging surface configured to match and mate with the surface. The jamming conformal pad has a stiff configuration in which the jamming conformal pad is stiff or relatively stiff as compared to the jamming conformal pad in the compliant configuration, and which substantially maintains a shape of the conformal engaging surface.

40 Claims, 5 Drawing Sheets

(56) References Cited

U.S. PATENT DOCUMENTS

| | | | |
|---|---|---|---|
| 3,449,008 A | * | 6/1969 | Colechia ............... B25J 13/082 |
| | | | 294/197 |
| 3,449,769 A | | 6/1969 | Mizen |
| 3,535,711 A | | 10/1970 | Fick |
| 3,759,563 A | | 9/1973 | Kitamura |
| 3,858,468 A | * | 1/1975 | Pasbrig ............... B25B 13/105 |
| | | | 81/185 |
| 4,046,262 A | | 9/1977 | Vykukal et al. |
| 4,179,233 A | | 12/1979 | Bromell et al. |
| 4,200,596 A | | 4/1980 | Iiyama et al. |
| 4,251,791 A | | 2/1981 | Yanagisawa et al. |
| 4,398,110 A | | 8/1983 | Flinchbaugh et al. |
| 4,483,407 A | | 11/1984 | Iwamoto et al. |
| 4,561,686 A | * | 12/1985 | Atchley ............... B66C 1/0206 |
| | | | 294/188 |
| 4,567,417 A | | 1/1986 | Francois et al. |
| 4,575,297 A | | 3/1986 | Richter |
| 4,591,944 A | | 5/1986 | Gravel |
| 4,603,896 A | | 8/1986 | Vasseur et al. |
| 4,661,032 A | | 4/1987 | Arai |
| 4,666,357 A | | 5/1987 | Babbi |
| 4,723,353 A | | 2/1988 | Monforte |
| 4,762,455 A | | 8/1988 | Coughlan et al. |
| 4,768,143 A | | 8/1988 | Lane et al. |
| 4,821,594 A | | 4/1989 | Rosheim et al. |
| 4,834,443 A | | 5/1989 | Crowder et al. |
| 4,853,874 A | | 8/1989 | Iwamoto et al. |
| 4,883,400 A | | 11/1989 | Kuban et al. |
| 4,884,720 A | | 12/1989 | Whigham et al. |
| 4,915,437 A | | 4/1990 | Cherry |
| 4,921,292 A | | 5/1990 | Harwell et al. |
| 4,997,095 A | | 3/1991 | Jones et al. |
| 5,004,391 A | | 4/1991 | Burdea |
| 5,038,089 A | | 8/1991 | Szakaly |
| 5,072,361 A | | 12/1991 | Davis et al. |
| 5,080,682 A | | 1/1992 | Schectman |
| 5,101,472 A | | 3/1992 | Repperger |
| 5,105,367 A | | 4/1992 | Tsuchihashi et al. |
| 5,117,814 A | | 6/1992 | Luttrell et al. |
| 5,144,943 A | | 9/1992 | Luttrell et al. |
| 5,172,951 A | | 12/1992 | Jacobsen et al. |
| 5,230,147 A | | 7/1993 | Asaoka et al. |
| 5,239,246 A | | 8/1993 | Kim |
| 5,246,216 A | * | 9/1993 | Oberst ............... B25B 1/2452 |
| | | | 269/266 |
| 5,280,981 A | | 1/1994 | Schulz |
| 5,282,460 A | | 2/1994 | Boldt |
| 5,328,224 A | | 7/1994 | Jacobsen et al. |
| 5,336,982 A | | 8/1994 | Backes |
| 5,389,849 A | | 2/1995 | Asano et al. |
| 5,399,951 A | | 3/1995 | Lavallee et al. |
| 5,516,249 A | | 5/1996 | Brimhall |
| 5,577,417 A | | 11/1996 | Fournier |
| 5,577,902 A | | 11/1996 | Todo et al. |
| 5,588,688 A | | 12/1996 | Jacobsen et al. |
| 5,664,636 A | | 9/1997 | Ikuma et al. |
| 5,704,945 A | | 1/1998 | Wagner et al. |
| 5,762,390 A | | 6/1998 | Gosselin et al. |
| 5,784,542 A | | 7/1998 | Ohm et al. |
| 5,785,505 A | | 7/1998 | Price |
| 5,797,615 A | | 8/1998 | Murray |
| 5,845,540 A | | 12/1998 | Rosheim |
| 5,865,770 A | | 2/1999 | Schectman |
| 5,898,599 A | | 4/1999 | Massie et al. |
| 5,912,658 A | | 6/1999 | Bergamasco et al. |
| 5,949,686 A | | 9/1999 | Yoshinada et al. |
| 5,957,981 A | | 9/1999 | Gramnas |
| 5,961,476 A | | 10/1999 | Betto et al. |
| 5,967,580 A | | 10/1999 | Rosheim |
| 5,994,864 A | | 11/1999 | Inoue et al. |
| 6,016,385 A | | 1/2000 | Yee et al. |
| 6,170,162 B1 | | 1/2001 | Jacobsen et al. |
| 6,202,013 B1 | | 3/2001 | Anderson et al. |
| 6,272,924 B1 | | 8/2001 | Jansen |
| 6,301,526 B1 | | 10/2001 | Kim et al. |
| 6,338,605 B1 | | 1/2002 | Halverson et al. |
| 6,340,065 B1 | | 1/2002 | Harris |
| 6,360,166 B1 | | 3/2002 | Alster |
| 6,394,731 B1 | | 5/2002 | Konosu et al. |
| 6,425,865 B1 | | 7/2002 | Salcudean et al. |
| 6,430,473 B1 | | 8/2002 | Lee et al. |
| 6,435,794 B1 | | 8/2002 | Springer |
| 6,507,163 B1 | | 1/2003 | Allen |
| 6,508,058 B1 | | 1/2003 | Seaverson |
| 6,554,342 B1 | | 4/2003 | Burnett |
| 6,641,371 B2 | | 11/2003 | Graziani et al. |
| 6,659,703 B1 | | 12/2003 | Kirkley |
| 6,659,939 B2 | | 12/2003 | Moll et al. |
| 6,663,154 B2 | | 12/2003 | Pancheri |
| 6,714,839 B2 | | 3/2004 | Salisbury, Jr. et al. |
| 6,740,125 B2 | | 5/2004 | Mosler |
| 6,855,170 B2 | | 2/2005 | Gramnas |
| 7,168,748 B2 | | 1/2007 | Townsend et al. |
| 7,396,057 B2 | | 7/2008 | Ye et al. |
| 7,405,531 B2 | | 7/2008 | Khatib et al. |
| 7,409,882 B2 | | 8/2008 | Massimo et al. |
| 7,410,338 B2 | | 8/2008 | Schiele et al. |
| 7,509,905 B2 | | 3/2009 | Jacobsen et al. |
| 7,628,766 B1 | | 12/2009 | Kazerooni et al. |
| 7,783,384 B2 | | 8/2010 | Kraft |
| 7,862,522 B1 | | 1/2011 | Barclay et al. |
| 7,862,524 B2 | | 1/2011 | Carignan et al. |
| 7,883,546 B2 | | 2/2011 | Kazerooni et al. |
| 7,947,004 B2 | | 5/2011 | Kazerooni et al. |
| 7,965,006 B2 | | 6/2011 | Kang et al. |
| 8,024,071 B2 | | 9/2011 | Komatsu et al. |
| 8,051,764 B2 | | 11/2011 | Jacobsen et al. |
| 8,100,451 B2 | * | 1/2012 | Okuda ............... B25J 15/0009 |
| | | | 294/106 |
| 8,132,835 B2 | | 3/2012 | Ban et al. |
| 8,151,401 B2 | | 4/2012 | Cheyne |
| 8,182,010 B2 | | 5/2012 | Lee et al. |
| 8,245,728 B2 | | 8/2012 | Jacobsen et al. |
| 8,295,975 B2 | | 10/2012 | Arimatsu et al. |
| 8,375,982 B2 | | 2/2013 | Gray, Jr. |
| 8,435,309 B2 | | 5/2013 | Gilbert et al. |
| 8,452,447 B2 | | 5/2013 | Nixon |
| 8,473,101 B2 | | 6/2013 | Summer |
| 8,511,192 B2 | | 8/2013 | Hirtt et al. |
| 8,516,918 B2 | | 8/2013 | Jacobsen et al. |
| 8,529,582 B2 | | 9/2013 | Devengenzo et al. |
| 8,534,728 B1 | * | 9/2013 | Bosscher ............... B25J 15/106 |
| | | | 294/86.4 |
| 8,560,118 B2 | | 10/2013 | Greer et al. |
| 8,640,723 B2 | | 2/2014 | Jacobsen et al. |
| 8,667,643 B2 | | 3/2014 | Simonelli et al. |
| 8,672,378 B2 | | 3/2014 | Yamasaki et al. |
| 8,747,486 B2 | | 6/2014 | Kawasaki et al. |
| 8,794,262 B2 | | 8/2014 | Jacobsen et al. |
| 8,821,338 B2 | | 9/2014 | Thorson |
| 8,849,457 B2 | | 9/2014 | Jacobsen et al. |
| 8,870,967 B2 | | 10/2014 | Herr et al. |
| 8,881,616 B2 | | 11/2014 | Dize et al. |
| 8,888,864 B2 | | 11/2014 | Iverson et al. |
| 8,892,258 B2 | | 11/2014 | Jacobsen et al. |
| 8,920,517 B2 | | 12/2014 | Smith et al. |
| 8,942,846 B2 | | 1/2015 | Jacobsen et al. |
| 8,977,388 B2 | | 3/2015 | Jacobsen et al. |
| 8,977,398 B2 | | 3/2015 | Jacobsen et al. |
| 9,295,604 B2 | | 3/2016 | Zoss et al. |
| 9,314,921 B2 | | 4/2016 | Jacobsen et al. |
| 9,329,587 B2 | | 5/2016 | Fudaba et al. |
| 9,333,097 B2 | | 5/2016 | Herr et al. |
| 9,533,411 B2 | | 1/2017 | Jacobsen et al. |
| 9,616,580 B2 | | 4/2017 | Smith et al. |
| 9,643,323 B2 | | 5/2017 | Nagatsuka et al. |
| 9,727,076 B2 | | 8/2017 | Smith et al. |
| 9,789,603 B2 | | 10/2017 | Jacobsen et al. |
| 9,895,812 B2 | | 2/2018 | Gonzalez et al. |
| 10,028,844 B2 | | 7/2018 | Cheng et al. |
| 10,071,485 B2 | | 9/2018 | Schiele et al. |
| 10,216,177 B2 | | 2/2019 | Gildert et al. |
| 10,406,676 B2 | | 9/2019 | Smith et al. |
| 10,512,583 B2 | | 12/2019 | Smith |

(56) References Cited

U.S. PATENT DOCUMENTS

| | | |
|---|---|---|
| 10,533,542 B2 | 1/2020 | Smith et al. |
| 10,566,914 B2 | 2/2020 | Fujita et al. |
| 2001/0033146 A1 | 10/2001 | Kato et al. |
| 2001/0043847 A1 | 11/2001 | Kramer |
| 2002/0075233 A1 | 6/2002 | White et al. |
| 2002/0094919 A1 | 7/2002 | Rennex et al. |
| 2003/0005896 A1 | 1/2003 | Jacobsen et al. |
| 2003/0146720 A1 | 8/2003 | Riwan et al. |
| 2003/0152452 A1 | 8/2003 | Hodgson |
| 2003/0223844 A1 | 12/2003 | Schiele et al. |
| 2004/0004362 A1 | 1/2004 | Love |
| 2004/0037681 A1 | 2/2004 | Marcotte |
| 2004/0102723 A1 | 5/2004 | Horst |
| 2004/0106881 A1 | 6/2004 | McBean et al. |
| 2004/0116836 A1 | 6/2004 | Kawai et al. |
| 2004/0246769 A1 | 12/2004 | Ido |
| 2004/0250644 A1 | 12/2004 | Gosselin et al. |
| 2005/0059908 A1 | 3/2005 | Bogert |
| 2005/0099386 A1 | 5/2005 | Kukita |
| 2005/0159850 A1 | 7/2005 | Melman |
| 2005/0166413 A1 | 8/2005 | Crampton |
| 2005/0193451 A1 | 9/2005 | Quistgaard et al. |
| 2005/0251110 A1 | 11/2005 | Nixon |
| 2006/0052732 A1 | 3/2006 | Shimada et al. |
| 2006/0064047 A1 | 3/2006 | Shimada et al. |
| 2006/0069449 A1 | 3/2006 | Bisbee, III et al. |
| 2006/0130594 A1 | 6/2006 | Ikeuchi |
| 2006/0149419 A1 | 7/2006 | Ogawa et al. |
| 2006/0184275 A1 | 8/2006 | Hosokawa et al. |
| 2006/0197049 A1 | 9/2006 | Hamada et al. |
| 2006/0245897 A1 | 11/2006 | Hariki et al. |
| 2006/0249315 A1 | 11/2006 | Herr et al. |
| 2007/0054777 A1 | 3/2007 | Kawai et al. |
| 2007/0105070 A1 | 5/2007 | Trawick |
| 2007/0123997 A1 | 5/2007 | Herr et al. |
| 2007/0129653 A1 | 6/2007 | Sugar et al. |
| 2008/0009771 A1 | 1/2008 | Perry et al. |
| 2008/0023974 A1 | 1/2008 | Park et al. |
| 2008/0156363 A1 | 7/2008 | Ikeuchi et al. |
| 2008/0269027 A1 | 10/2008 | Chen |
| 2008/0271942 A1 | 11/2008 | Yamashita et al. |
| 2008/0281468 A1 | 11/2008 | Jacobsen et al. |
| 2009/0036815 A1 | 2/2009 | Ido |
| 2009/0038258 A1 | 2/2009 | Pivac et al. |
| 2009/0039579 A1 | 2/2009 | Clifford et al. |
| 2009/0199883 A1 | 8/2009 | Hiki |
| 2009/0210093 A1 | 8/2009 | Jacobsen et al. |
| 2009/0294238 A1 | 12/2009 | Gilmore |
| 2010/0050947 A1 | 3/2010 | Kortekaas |
| 2010/0089855 A1 | 4/2010 | Kjolseth |
| 2010/0094185 A1 | 4/2010 | Amundson et al. |
| 2010/0152630 A1 | 6/2010 | Matsuoka et al. |
| 2010/0198402 A1 | 8/2010 | Greer et al. |
| 2010/0241242 A1 | 9/2010 | Herr et al. |
| 2010/0295497 A1 | 11/2010 | Takamatsu |
| 2011/0010012 A1 | 1/2011 | Murayama et al. |
| 2011/0040216 A1 | 2/2011 | Herr et al. |
| 2011/0046781 A1 | 2/2011 | Summer |
| 2011/0066088 A1 | 3/2011 | Little et al. |
| 2011/0071677 A1 | 3/2011 | Stillman |
| 2011/0214524 A1 | 9/2011 | Jacobsen et al. |
| 2011/0219899 A1 | 9/2011 | Dize et al. |
| 2011/0264230 A1 | 10/2011 | Herr et al. |
| 2012/0000891 A1 | 1/2012 | Nakanishi et al. |
| 2012/0060322 A1 | 3/2012 | Simonelli et al. |
| 2012/0065902 A1 | 3/2012 | Nakajima |
| 2012/0073930 A1 | 3/2012 | Lansberry et al. |
| 2012/0137667 A1 | 6/2012 | Jacobsen et al. |
| 2012/0179075 A1 | 7/2012 | Perry et al. |
| 2012/0191245 A1 | 7/2012 | Fudaba et al. |
| 2012/0216671 A1 | 8/2012 | Gammon |
| 2012/0237319 A1 | 9/2012 | Jacobsen et al. |
| 2012/0259429 A1 | 10/2012 | Han et al. |
| 2012/0277901 A1 | 11/2012 | Jacobsen et al. |
| 2012/0277911 A1 | 11/2012 | Jacobsen et al. |
| 2012/0277915 A1 | 11/2012 | Jacobsen et al. |
| 2012/0328395 A1 | 12/2012 | Jacobsen et al. |
| 2013/0011220 A1 | 1/2013 | Jacobsen et al. |
| 2013/0013108 A1 | 1/2013 | Jacobsen et al. |
| 2013/0023803 A1 | 1/2013 | Hsu et al. |
| 2013/0033050 A1 | 2/2013 | Matsuoka et al. |
| 2013/0057001 A1 | 3/2013 | Tsai |
| 2013/0090580 A1 | 4/2013 | Hong et al. |
| 2013/0106127 A1 | 5/2013 | Lipson et al. |
| 2013/0106128 A1 | 5/2013 | Yamasaki et al. |
| 2013/0192406 A1 | 8/2013 | Godowski |
| 2013/0226048 A1 | 8/2013 | Unluhisarcikili et al. |
| 2013/0253385 A1 | 9/2013 | Goffer et al. |
| 2013/0296746 A1 | 11/2013 | Herr et al. |
| 2013/0302129 A1 | 11/2013 | Smith et al. |
| 2013/0306430 A1 | 11/2013 | Laffranchi et al. |
| 2013/0331744 A1 | 12/2013 | Kamon |
| 2013/0333368 A1 | 12/2013 | Durfee et al. |
| 2014/0088728 A1 | 3/2014 | Herr |
| 2014/0100492 A1 | 4/2014 | Nagasaka |
| 2014/0190289 A1 | 7/2014 | Zhu |
| 2014/0195052 A1 | 7/2014 | Tsusaka et al. |
| 2015/0073595 A1 | 3/2015 | Fudaba et al. |
| 2015/0073596 A1 | 3/2015 | Fudaba et al. |
| 2015/0173929 A1 | 6/2015 | Kazerooni et al. |
| 2015/0209214 A1 | 7/2015 | Herr et al. |
| 2015/0272749 A1 | 10/2015 | Amend, Jr. et al. |
| 2015/0278263 A1 | 10/2015 | Bowles et al. |
| 2015/0289995 A1 | 10/2015 | Wilkinson et al. |
| 2015/0321340 A1 | 11/2015 | Smith |
| 2015/0321342 A1 | 11/2015 | Smith et al. |
| 2016/0003268 A1 | 1/2016 | Shevchenko et al. |
| 2016/0114482 A1* | 4/2016 | Lessing ................ B25J 15/083 |
| | | 606/130 |
| 2016/0153508 A1 | 6/2016 | Battlogg |
| 2016/0279788 A1 | 9/2016 | Kanaoka et al. |
| 2016/0331556 A1* | 11/2016 | Wijesundara ........... F15B 15/10 |
| 2016/0331572 A1 | 11/2016 | Popovic et al. |
| 2016/0332302 A1 | 11/2016 | Bingham et al. |
| 2016/0332305 A1 | 11/2016 | Gonzalez et al. |
| 2017/0050310 A1 | 2/2017 | Kanaoka |
| 2018/0133905 A1 | 5/2018 | Smith et al. |
| 2018/0133906 A1 | 5/2018 | Smith et al. |
| 2018/0193172 A1 | 7/2018 | Smith et al. |
| 2018/0193999 A1 | 7/2018 | Jacobsen et al. |
| 2018/0194000 A1 | 7/2018 | Smith et al. |
| 2018/0290309 A1 | 10/2018 | Becker et al. |
| 2018/0298976 A1 | 10/2018 | Battlogg |
| 2019/0105777 A1 | 4/2019 | Dalley et al. |
| 2019/0176320 A1 | 6/2019 | Smith et al. |
| 2019/0184576 A1 | 6/2019 | Smith et al. |
| 2020/0001450 A1 | 1/2020 | Smith et al. |

FOREIGN PATENT DOCUMENTS

| | | |
|---|---|---|
| CN | 203495949 U | 3/2014 |
| CN | 203752160 U | 8/2014 |
| CN | 104843484 A | 8/2015 |
| CN | 105411813 A | 3/2016 |
| CN | 105818143 A | 8/2016 |
| CN | 107471203 A | 12/2017 |
| CN | 108081303 A | 5/2018 |
| DE | 102004029513 B3 | 9/2005 |
| DE | 102010029088 A1 | 11/2011 |
| DE | 202013009698 U1 | 11/2013 |
| DE | 102016201540 A1 | 8/2017 |
| EP | 0039578 A1 | 11/1981 |
| EP | 0616275 A3 | 9/1998 |
| EP | 1037264 A2 | 9/2000 |
| EP | 1258324 A2 | 11/2002 |
| EP | 1442846 A1 | 8/2004 |
| EP | 1721593 A1 | 11/2006 |
| EP | 2198810 A1 | 6/2010 |
| EP | 2548543 B1 | 1/2015 |
| EP | 2942162 A2 | 11/2015 |
| EP | 2168548 B1 | 10/2016 |
| FR | 2651220 A1 | 3/1991 |
| GB | 686237 A | 1/1953 |
| GB | 2278041 A | 11/1994 |

(56) References Cited

FOREIGN PATENT DOCUMENTS

| | | |
|---|---|---|
| JP | S34-015764 | 10/1959 |
| JP | S36-005228 | 5/1961 |
| JP | S44-000603 | 1/1969 |
| JP | S50-009803 | 1/1975 |
| JP | S50-006043 | 3/1975 |
| JP | S52-013252 A | 2/1977 |
| JP | S52-134985 A | 11/1977 |
| JP | S56-140510 A | 11/1981 |
| JP | S58-113586 A | 7/1983 |
| JP | S58-45724 B2 | 10/1983 |
| JP | S60-177883 U | 11/1985 |
| JP | S62-193784 A | 8/1987 |
| JP | S62-200600 A | 9/1987 |
| JP | H01-295772 A | 11/1989 |
| JP | H02-51083 U | 4/1990 |
| JP | H03-85398 U | 8/1991 |
| JP | H04-44296 U | 4/1992 |
| JP | H05-004177 A | 1/1993 |
| JP | H05-023989 A | 2/1993 |
| JP | H06-213266 A | 8/1994 |
| JP | H07-001366 A | 1/1995 |
| JP | H07-5129 Y2 | 2/1995 |
| JP | H07-060679 A | 3/1995 |
| JP | H07-112377 A | 5/1995 |
| JP | H07-031291 U | 6/1995 |
| JP | H07-246578 A | 9/1995 |
| JP | H08-126984 A | 5/1996 |
| JP | H09-11176 A | 1/1997 |
| JP | H1156931 | 3/1999 |
| JP | H11-130279 A | 5/1999 |
| JP | 2002-161547 A | 6/2002 |
| JP | 2003-103480 A | 4/2003 |
| JP | 2004-105261 A | 4/2004 |
| JP | 2005-118938 A | 5/2005 |
| JP | 2005-237504 A | 9/2005 |
| JP | 2005-334999 A | 12/2005 |
| JP | 2006-007337 A | 1/2006 |
| JP | 2006-016916 A | 1/2006 |
| JP | 2006-028953 A | 2/2006 |
| JP | 2006-051558 A | 2/2006 |
| JP | 2006-167223 A | 6/2006 |
| JP | 3909770 B2 | 4/2007 |
| JP | 2007-130234 A | 5/2007 |
| JP | 2007-252514 A | 10/2007 |
| JP | 2007-307216 A | 11/2007 |
| JP | 2008-143449 A | 6/2008 |
| JP | 2009-023828 A | 2/2009 |
| JP | 2009-167673 A | 7/2009 |
| JP | 2009-178253 A | 8/2009 |
| JP | 2009-219650 A | 10/2009 |
| JP | 2009-240488 A | 10/2009 |
| JP | 2009-268839 A | 11/2009 |
| JP | 2010-098130 A | 4/2010 |
| JP | 2010-110381 A | 5/2010 |
| JP | 2010-110465 A | 5/2010 |
| JP | 2010-142351 A | 7/2010 |
| JP | 2011-193899 A | 10/2011 |
| JP | 2012-501739 A | 1/2012 |
| JP | 2012-125279 A | 7/2012 |
| JP | 2013-022091 A | 2/2013 |
| JP | 2013-090693 A | 5/2013 |
| JP | 2013-123786 A | 6/2013 |
| JP | 2013-142445 A | 7/2013 |
| JP | 5267730 | 8/2013 |
| JP | 2013-220496 A | 10/2013 |
| JP | 2013-248699 A | 12/2013 |
| JP | 2014-054273 A | 3/2014 |
| JP | 2014-073222 A | 4/2014 |
| JP | 2014-200853 A | 10/2014 |
| JP | 2015-112649 A | 6/2015 |
| JP | 2015-212010 A | 11/2015 |
| JP | 2015-214019 A | 12/2015 |
| JP | 2016-539017 A | 12/2016 |
| KR | 2005-0037754 A | 4/2005 |
| KR | 2007-0057209 A | 6/2007 |
| KR | 2012-0105194 A | 9/2012 |
| KR | 10-1219795 | 1/2013 |
| KR | 2013-0001409 A | 1/2013 |
| KR | 2013-0045777 A | 5/2013 |
| KR | 2018-0128731 A | 12/2018 |
| WO | WO 2003/002309 A1 | 1/2003 |
| WO | WO 2003/081762 A1 | 10/2003 |
| WO | WO 2007/144629 A2 | 12/2007 |
| WO | WO 2009/143377 A2 | 11/2009 |
| WO | WO 2010/025409 A1 | 3/2010 |
| WO | WO 2010/027968 A2 | 3/2010 |
| WO | WO 2012/042471 A1 | 4/2012 |
| WO | WO 2017/148499 A1 | 9/2017 |
| WO | WO 2017/159504 A1 | 9/2017 |
| WO | WO 2018/118004 A1 | 6/2018 |
| WO | WO 2018/211869 A1 | 11/2018 |
| WO | WO 2018/215705 A1 | 11/2018 |
| WO | WO 2019/060791 A1 | 3/2019 |

OTHER PUBLICATIONS

Aliens (Movie), Starring Sigourney Weaver, Directed by James Cameron, Written by James Cameron, David Giler, Walter Hill, Dan O'Bannon, and Ronald Shuset, Released 1985 by Twentieth Century Fox, Scenes at Playtime 88:26:31-00:26:59 & 00:27:40-00:28:05 & 02:08:25-02:10:39 Non-Patent Literature documentation; Aliens(1986)—IMDb; downloaded Sep. 27, 2014; 4 pages; http://www.imdb.com/title/ttl0090605/.

Amikabir University of Technology, Manipulator Dynamics (Power Point), Computer Engineering and Information Technology Department, to the best of applicant's knowledge article was available before the application filing date, 44 pages.

Barras, Stabilization of a Biped Robot with its arms—A Practical Approach, http://biorob.epfl.ch/files/content/sites/biorob/filed/users/170220/public/Report.pdf; May 2010, 33 pages, EPFL Biorobotics Laboratory (BioRob), Switzerland.

Bauman, Utah Firm Markets on Big Gorilla of an Arm, Deseret News; Jan. 27, 1993, 2 pages, Deseret News Publishing Company, Salt Lake City, Utah.

Claeyssen et al., Magnetostrictive actuators compared to piezoelectric actuators, Proceedings of SPIE—The International Society for Optical Engineering 4763, Mar. 2003, 6 pages.

Digital World Tokyo, Giant Robot Grabbing Hands Grab All They Can, www.dieitalwordtokyo.com/index.ohp/digital_tokyo/articles/giant_robot_grabbing_hands_grab_all_they_can/, Jul. 17, 2003, 3 pages.

Elliott et al., The Biomechanics and Energetics of Human Running using an Elastic Knee Exoskeleton, Jun. 2013, 7 pages, IEEE International Conference on Rehabilitation Robotics, Seattle, Washington.

Elliott et al., Design of a Clutch-Spring Knee Exoskeleton for Running, Journal of Medical Devices, Sep. 2014, 11 pages, vol. 8, The American Society of Mechanical Engineers, New York City, New York.

Endo et al., A quasi-passive model of human leg function in level-ground walking, 2006 IEEE/RSJ International Conference on Intelligent Robots and Systems, Oct. 9-15, 2006, pp. 4935-4939, Institute of Electrical and Electronics Engineers, Piscataway, New Jersey.

Gauthier et al., Magnetic Shape Memory Alloy and Actuator Design, Conference: 5th International Workshop on Microfactories (IWMF'06), Oct. 2006, 5 pages, Besançon, France.

Grabowski et al., Exoskeletons for Running and Hopping Augmentation, Journal of Applied Physiology, http://biomech.media.mit.edu/portfolio_page/load-bearing-exoskeleton-for-augmentation-of-human-running/2009, 4 pages, vol. 107, No. 3, American Physiological Society, United States.

Hauser et al., JammJoint: A Variable Stiffness Device Based on Granular Jamming for Wearable Joint Support, IEEE Robotics and Automation Letters, Apr. 2017, 7 pages, vol. 2, Issue 2, Institute of Electrical and Electronics Engineers, Piscataway, New Jersey.

(56) References Cited

OTHER PUBLICATIONS

Huber et al., The selection of mechanical actuators based on performance indices, Oct. 8, 1997, pp. 2185-2205, vol. 453 Issue 1965, The Royal Society, London.

Hunter et al., Fast Reversible NiTi Fibers For Use in Microrobotics, Proceedings. IEEE Micro Electro Mechanical Systems, Jan. 30-Feb. 2, 1991, pp. 166-170, Institute of Electrical and Electronics Engineers, Piscataway, New Jersey.

Industrial Magnetics, Inc., PowerLift® Magnets; www.magnetics.com/product.asp?ProductID=1; accessed Nov. 6, 2012, 2 pages; Boyne City, Michigan.

Jacobsen et al., Design of the Utah/M.I.T. Dextrous Hand, IEEE International Conference on Robotics and Automation, 1986, pp. 1520-1532, Institute of Electrical and Electronics Engineers, Piscataway, New Jersey.

Jacobsen et al., Development of the Utah Artificial Arm, IEEE Transactions on Biomedical Engineering, Apr. 1982, pp. 249-269, vol. BME-29, No. 4, Institute of Electrical and Electronics Engineers, Piscataway, New Jersey.

Jacobsen et al., Research Robots for Application in A1, Teleoperation and Entertainment, Proceedings of the International Fluid Power Exposition and Technical Conference, Mar. 24-24, 1992, pp. 1-19, Chicago, Illinois.

Jacobsen et al., Research Robots for Applications in Artificial Intelligence, Teleoperation and Entertainment; The International Journal of Robotics Research; Apr.-May 2004, pp. 319-330, vol. 23, No. 4-5, Sage Publications, Thousand Oaks, California.

Jacobsen, Science, Robotics, and Superheroes, Presented at Department of Science University of Utah Science at Breakfast, Mar. 17, 2010, 16 pages.

Jafari et al., A Novel Actuator with Adjustable Stiffness (AwAS), Oct. 18-22, 2010, 6 pages, IEEE/RSJ International Conference on Intelligent Robots and Systems, Taiwan.

Jansen et al., Exoskeleton for Soldier Enhancement Systems Feasibility Study, Sep. 2000, 44 pages, Oak Ridge National Laboratory, Oak Ridge, Tennessee.

Kazerooni, Berkeley Lower Extremity Exoskeleton (BLEEX), to the best of applicant's knowledge article was available before the application filing date, 3 pages, University of California, Berkeley, Berkeley, California.

Kim, Development of a small 6-axis force/moment sensor for robot's fingers, Measurement Science and Technology, Sep. 30, 2004, 2 pages, Issue 11, Institute of Physics and IOP Publishing Limited.

Kim et al., A Force Reflected Exoskeleton-Type Masterarm for Human-Robot Interaction, IEEE Transactions on Systems, Man and Cybertentics—Part A: Systems and Humans, Mar. 2005, pp. 198-212, vol. 35, No. 2, Institute of Electrical and Electronics Engineers, Piscataway, New Jersey.

Kulick, An Unpowered Exoskeleton Springs Into Action: Researchers Increase Walking Efficiency, http://www.cmu.edu/me/news/archive/2015/collins-clutch.html, Apr. 1, 2015, 2 pages, Carnegie Mellon University Mechanical Engineering, Pittsburgh, Pennsylvania.

Laliberte et al., Underactuation in Space Robotic Hands. Proceeding of the 6th International Symposium on Artificial Intelligence and Robotics & Automation in Space, Jun. 18-22, 2001, 8 pages, Canadian Space Agency, Canada.

Magnetic Base, www.ask.com/wiki/magnetic_base; page last updated Sep. 12, 2012, 2 pages, retrieved from www.ask.com/wiki/magnetic_base.

Miao et al., Mechanical Design of Hybrid Leg Exoskeleton to Augment Load-Carrying for Walking, International Journal of Advanced Robotic Systems, Mar. 28, 2013, 11 pages, vol. 10, Intech open science open minds, Europe.

Mirfakhrai et al., Polymer artificial muscles, materialstoday, Apr. 2007, pp. 30-38, vol. 10 No. 4, Elsevier, Netherlands.

Mombaur et al., HEiKA-EXO: Optimization-based development and control of an exoskeleton for medical applications, http://typo.iwr.uni-heidelberg.de/groups/orb/research/heika-exo/, Optimization in Robotics & Biomechanics, Oct. 20, 2014, 3 pages, Germany.

Moosavian et al., Dynamics Modeling and Tip-Over Stability of Suspended Wheeled Mobile Robots with Multiple Arms, 2007 IEEE/RSJ International Conference on Intelligent Robots and Systems, Oct. 29-Nov. 2, 2007; pp. 1210-1215, Institute of Electrical and Electronics Engineers, Piscataway, New Jersey.

Newport Corporation, Heavy-Duty Magnetic Base, 300 lb (1334 N) Holding Force, ¼-20 Thread, http://search.newport.com/q=*&x2=sku&q2=200, as accessed Apr. 23, 2011, 1 page, Irvine, CA.

Oak Ridge National Laboratory, Foot Force-Torque Sensor Novel Sensor for Measuring Forces and Torques at the Foot, www.ornl.gov. to the best of applicant's knowledge article was available before the application filing date, 1 page, Oak Ridge National Laboratory, Oak Ridge, Tennessee.

Omega, Load Cell Designs, www.omega.com/literature/transactions/volume3/load3.html, Nov. 1, 2005, 3 pages.

Ostling, Wearable Robots, Technology Review, Jul./Aug. 2004, pp. 70-73, Elizabeth Bramson-Boudreau, Cambridge, Massachusetts.

Pan, Improved Design of a Three-degree of Freedom Hip Exoskeleton Based on Biomimetic Parallel Structure, Jul. 2011, 132 pages, University of Ontario Institute of Technology, Canada.

Pelrine et al., Electrostriction of polymer dielectrics with compliant electrodes as a means of actuation, Sensors and Actuators A: Physical, Jan. 1998, pp. 77-85, vol. 64 Issue 1, Elsevier, Netherlands.

Pelrine et al., High-field deformation of elastomeric dielectrics for actuators, Materials Science and Engineering, Nov. 28, 2000, pp. 89-100, vol. 11 Issue 2, Elsevier, Netherlands.

Pelrine et al., Dielectric Elastomer Artificial Muscle Actuators: Toward Biomimetic Motion, Proceedings of SPIE—The International Society for Optical Engineering, Jul. 2002, pp. 126-137, vol. 4695, SPIE, Bellingham, WA.

Pin, Wearable Robotics Presented to New Horizons in Science Briefing, Oct. 2003, 34 pages, Knoxville, Tennessee.

Pratt et al., The RoboKnee: An Exoskeleton for Enhancing Strength and Endurance During Walking, International Conference on Robotics & Automation, Apr. 2004, 6 pages, IEEE, New Orleans, LA.

Robotics Research Group, Degrees of Freedom, www.robotics.utexas.edu/rrg/learn_more/low_ed/dof/, Oct. 25, 2006, 2 pages, University of Texas.

Rouse et al., Clutchable Series-Elastic Actuator: Design of a Robotic Knee Prosthesis for Minimum Energy Consumption, 2013 IEEE 13th International Conference on Rehabilitation Robotics (ICORR), Jun. 24-26, 2013, 6 pages, Institute of Electrical and Electronics Engineers, Piscataway, New Jersey.

Schuler et al., Dextrous Robot Arm, In Proceedings of the $8^{th}$ ESA Workshop on Advanced Space Technologies for Robotic and Automation 'ASTRA 2004' ESTEC, Nov. 2-4, 2004, 8 pages, Noordwijk, The Netherlands.

Searchmap Blog, Scientists Develop Mechanical Spring-Loaded Leg Brace to Improve Walking, http://www.searchmap.eu/blog/scientists-develop-mechanical-spring-loaded-leg-brace-to-improve-walking/, Apr. 1, 2015, 5 pages, Searchmap Blog.

Seppala, These exoskeleton heels could help stroke victims walk again, https://www.engadget.com/2015/04/02/feet-exoskeletons/, Apr. 2, 2015, Engadget, San Francisco, California.

Shamaei et al., Estimation of Quasi-Stiffness of the Human Knee in the Stance Phase of Walking, Mar. 22, 2013, 10 pages, vol. 8 Issue 3, PLOS One, San Francisco, California.

Siddharth et al., Design and Analysis of a 1-DOF Walking Mechanism, http://siddharthswaminathan.in/files/WalkingMechanism.pdf, Nov. 2012, 7 pages, India.

Smith et al., Integrated thin-film piezoelectric traveling wave ultrasonic motors, Sensors and Actuators A: Physical, Dec. 2012, pp. 305-311, vol. 188, Elsevier, Netherlands.

Song et al., Kinematics Analysis and Implementation of a Motion-Following Task for a Humanoid Slave Robot Controlled by an Exoskeleton Master Robot, International Journal of Control, Automation and Systems, Dec. 2007, pp. 681-690, vol. 5, No. 6, Korean Institute of Electrical Engineers, South Korea.

Suitx, Phoenix Medical Exoskeleton, https://www.suitx.com/phoenix-medical-exoskeleton, 3 pages, to the best of the applicant's knowl- (56) References Cited

OTHER PUBLICATIONS edge article was available before the application filing date, US Bionics, Inc., Berkeley, California.

Suleiman, Engineering an affordable exoskeleton, Phys.org, https://phys.org/news/2014-06-exoskeleton.html, Jun. 12, 2014, 5 pages, Science X Network.

Tmsuk, Rescue Robot "T-53" release Control Technologies to Control the Synchronous Operation of the Arm, http://robot.watch.impress.co.jp/cda/news/2007/07/18/564.html. as accessed Sep. 1, 2011 5 pages, Robot Watch website.

Ueda et al., Large Effective-Strain Piezoelectric Actuators Using Nested Cellular Architecture With Exponential Strain Amplification Mechanisms, IEEE/ASME Transactions on Mechatronics, Oct. 2010, pp. 770-782, vol. 15 Issue 5, Institute of Electrical and Electronics Engineers, Piscataway, New Jersey.

Vanderborght et al., Variable impedance actuators: A review, Robotics and Autonomous Systems, Dec. 2013, 14 pages, vol. 61, Issue 12, Elsevier, Netherlands.

Walsh, Biomimetic Design of an Under-Actuated Leg Exoskeleton For Load-Carrying Augmentation, Massachusetts Institute of Technology, Feb. 2006, 97 pages, Massachusetts.

Walsh et al., A Quasi-Passive Leg Exoskeleton for Load-Carrying Augmentation, International Journal of Humanoid Robotics, Mar. 8, 2007, 20 pages, vol. 4, No. 3, World Scientific Publishing Company.

Wang et al., A highly-underactuated robotic hand with force and joint angle sensors, 2011 IEEE/RSJ International Conference on Intelligent Robots and Systems, Sep. 25-30, 2011, 6 pages, Institute of Electrical and Electronics Engineers, Piscataway, New Jersey.

Yeates, Utah-built robot safeguards the workplace, http://www.ksl.com?nid=148&sid=17654421&autostart=y; Oct. 13, 2011, 3 pages, KSL Broadcasting, Salt Lake City, Utah.

Yip et al., High-Performance Robotic Muscles from Conductive Nylon Sewing Thread, 2015 IEEE International Conference on Robotics and Automation (ICRA), May 26-30, 2015, 6 pages, Seattle, Washington.

Zubrycki et al., Novel haptic glove-based interface using jamming principle, Proceedings of the 10$^{th}$ International Workshop on Robot Motion and Control, Jul. 6-8, 2015, 6 pages, IEEE, Poland.

International Search Report for International Application No. PCT/US2021/062051 dated Mar. 16, 2022, 29 pages.

International Search Report for International Application No. PCT/US2021/062052 dated Apr. 7, 2022, 19 pages.

International Search Report for International Application No. PCT/US2021/062053 dated Mar. 17, 2022, 16 pages.

International Search Report for International Application No. PCT/US2021/062055 dated Mar. 30, 2022, 15 pages.

International Search Report for International Application No. PCT/US2021/062056 dated Apr. 4, 2022, 16 pages.

Extended European Search Report dated Feb. 22, 2022 in EP Application No. 21184013.7 filed May 6, 2015, 9 pages.

\* cited by examiner

ROBOTIC END-EFFECTOR HAVING DYNAMIC STIFFENING ELEMENTS FOR CONFORMING OBJECT INTERACTION

BACKGROUND

Robotic hands or grippers typically grasp objects resulting in point or line contact and associated loads that can be awkward or less effective. Point or line contact and loads is/are particularly a result of the rigid surfaces making up the robotic hands or grippers, such as the finger(s), palms or other elements of the robotic hand or gripper. Such rigid surfaces also do not permit conforming of the robotic hand or gripper along its surfaces to the object being grasped. Stated differently, the rigid surfaces making up the robotic hand are not able to conform to the object being grasped. The development of robotic hands or grippers is an ongoing endeavor.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 12b is a side view of the end effector of FIG. 12a.

FIG. 14b is a side view of the end effector of FIG. 14a.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Disclosed herein is a robotic end-effector configured to provide conformal object interaction, comprising at least one gripping surface; one or more jamming conformal pads disposed on the at least one gripping surface, wherein each of the one or more jamming conformal pads is operable in at least two pad configurations, the at least two pad configurations comprising a compliant configuration in which a shape of the jamming conformal pad is changeable to achieve an engaged shape in response to engagement of the pad with the surface of an object; and a stiff configuration in which the jamming conformal pad maintains the engaged shape, and is relatively stiff compared to the jamming conformal pad in the compliant configuration.

The robotic end-effector can further comprise one or more fingers, each having one or more degrees of freedom, wherein the at least one gripping surface is defined by the one or more fingers. The robotic end effector can further comprise at least one finger, a palm, and a thumb extending from the palm and opposing the at least one finger, wherein the at least one gripping surface is defined by the at least one finger, the palm and the thumb, the jamming conformal pad associated with the at least the at least one finger and the thumb, or the palm, or a combination of these.

Disclosed herein is a robotic end-effector with one or more jamming conformal areas or pads to improving gripping of a workpiece or object. The end-effector can have one or more degrees of freedom. The one or more jamming conformal areas or pads can be disposed on and supported by an inner portion of the end-effector (e.g., an engaging surface of a corresponding finger of one or more fingers). The jamming conformal area or pad can be operable in at least two pad configurations, namely a compliant configuration and a stiff configuration. In the compliant or relaxed configuration, a shape of the jamming conformal area or pad is changeable to achieve an engaged shape in response to engagement of the pad with a surface of the object. In an example, in the event of the object comprising a contoured surface, the pad can distribute across the contoured surface of the object and infiltrate into indentations in the contoured surface, defining a conformal engaging surface that matches and mates with the contoured surface of the object. In the stiff configuration, the jamming conformal area or pad maintains the engaged shape, and is stiff or relatively stiff as compared to the jamming conformal area or pad in the compliant configuration. From the compliant configuration, the jamming conformal area or pad can be caused to become stiff or rigid to maintain the engaged shape and a shape off the conformal engaging surface if the end effector is grasping an object, and thus improve the grip of the end-effector on the object. In one aspect, the end-effector can have a single jamming conformal area or pad. In another aspect, the end-effector can have multiple jamming conformal areas or pads, with a single jamming conformal area or pad on each finger, a palm, or a combination of these. In another aspect, the end-effector can have multiple jamming conformal areas or pads on each finger.

In one aspect, the jamming conformal area or pad can comprise a filler flowable in a bladder. The filler can comprise particles. A flow characteristic of the filler can change or vary, and interaction forces between the particles in the filler change or vary, with pressure within the bladder. Resistance to change of the jamming conformal area or pad, or the bladder, varies with the flow characteristics of the filler. A pressure source can be coupled to the bladder to change or vary the pressure within the bladder, such as to collapse the bladder to some degree. Changing or varying the flow characteristics of the filler, and changing or varying interaction forces between the particles in the filler, changes or varies resistance of the bladder to movement of the bladder, and thus changes the configuration of the jamming conformal area or pad between compliant and stiff.

Figures 1A, 2B, 3B:
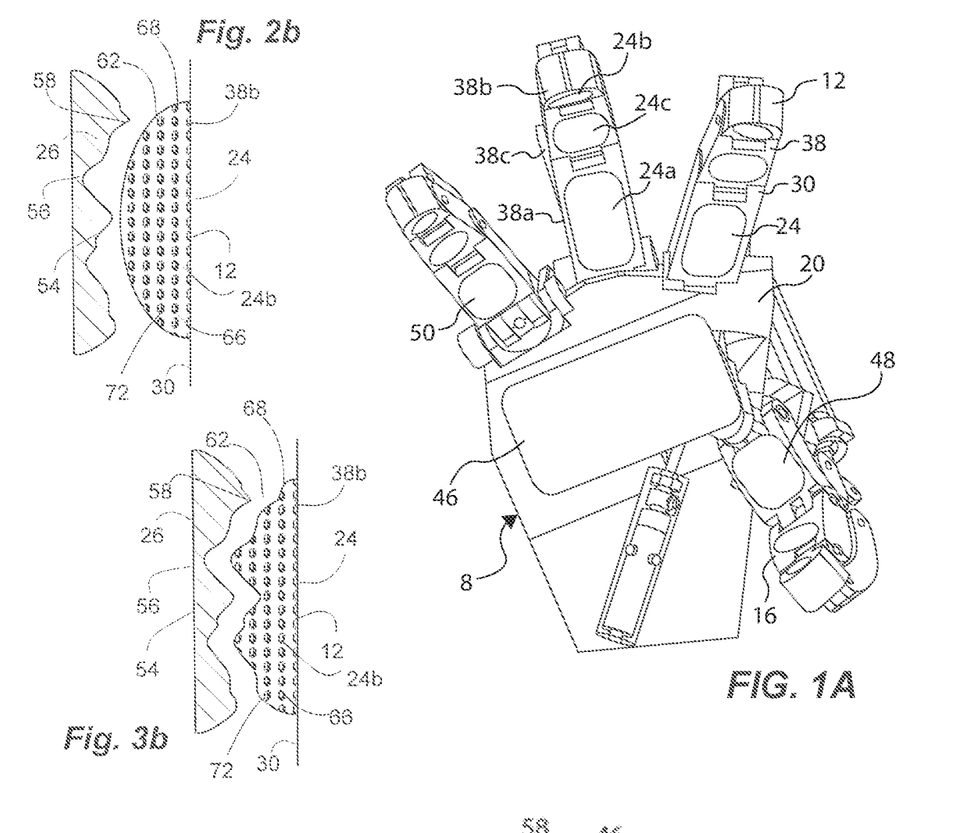
FIG. 1a is a front view of a robotic end-effector, namely a semi-anthropomorphic hand, with jamming conformal pads in accordance with an example.
FIG. 2b is a schematic cross-sectional side view of the jamming conformal pad of FIG. 1a shown in a non-contacting, compliant configuration with the object.
FIG. 3b is a schematic cross-sectional side view of the jamming conformal pad of FIG. 1a shown in a contacting, stiff configuration with the object removed.

FIG. 1a-5 depict an example robotic end-effector 8, namely a semi-anthropomorphic hand with three-fingers 12 and an opposable thumb 16 extending from a palm 20. FIG. 1a depicts the end-effector 8 open or empty, and with one or more jamming conformal areas or pads, indicated collectively at 24; while FIG. 1b depicts the end-effector 8 closed or grasping a workpiece or object 26. The fingers 12, the thumb 16 and the palm 20 of the end-effector 8 can have an inner portion 30 (which can also be referred to as an engaging side or surface) that faces inwardly and that engages directly or indirectly (i.e., indirectly due to the presence of a bladder and associated exterior membrane that at least partially covers the inner portion or engaging side or surface 30) the workpiece or object 26. In addition, the fingers 12 and the thumb 16 can be opposable and can oppose one another across a gap 34 that receives the workpiece or object 26. In one aspect, the thumb 16 can also be characterized as a finger 12 so that the end-effector 8 can have at least two opposing fingers 12 and 16. In another aspect, the end-effector 8 can have at least one finger 12 that can oppose another structure, such as the palm 20, so that the finger 12 can oppose and close against the palm 20.

Figure 1B:
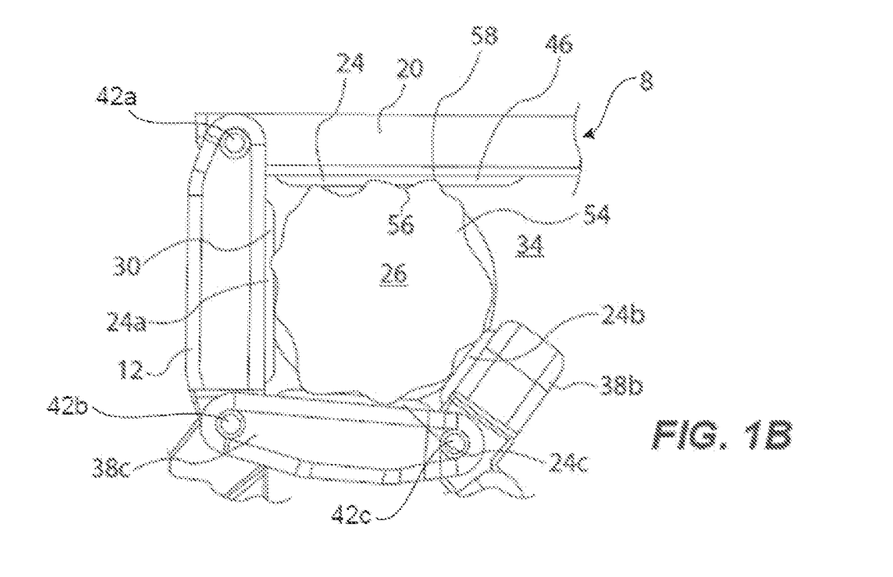
FIG. 1b is a side view of the robotic end-effector of FIG. 1a shown gripping an object.

Furthermore, the fingers 12 and the thumb 16 can be articulated and can have one or more degrees of freedom. For example, the fingers 12 and/or the thumb 16 can pivot with respect to the palm 20 or a base. In one aspect, each of the fingers 12 and the thumb 16 can have a series of segments, indicated collectively at 38, with adjacent segments movably coupled together at a joint, indicated collectively at 42. The fingers 12 and the thumb 16 can each have at least a proximal segment 38a coupled to the palm 20 and a distal free segment 38b. In addition, each finger 12 and thumb 16 can have an intermediate segment 38c intermediate the proximal and distal free segments 38a and 38b. Thus, each finger 12 and thumb 16 can have three segments 38. The fingers 12 and the thumb 16 are movable with respect to one another and with respect to the palm 20. Thus, the fingers 12 and the thumb 16 can move to vary the size of the gap 34. In one aspect, the fingers 12 and the thumb 16 can collapse on the gap 34 in order to grip the workpiece or object 26. In addition, the segments 38 of each finger 12 and thumb 16 can move with respect to an adjacent segment 38, or the palm 20, to grip the workpiece or object 26. The fingers 12 and the thumb 16, and the segments 38 thereof, can be operatively coupled to actuators and a controller to effect movement. Furthermore, the end-effector 8, and the fingers 12 and the thumb 16, and the segments 38 thereof, can be rigid members.

The end-effector 8, and the fingers 12, the thumb 16 and/or the palm 20, can have one or more jamming conformal areas or pads 24. The jamming conformal areas or pads 24 can be disposed on an inner portion 30 (e.g., the engaging sides) of the fingers 12, the thumb 16 and/or the palm 20, and carried or supported by the end-effector 8. Thus, the jamming conformal areas or pads 24 can be positioned to contact and engage the workpiece or object 26, and can be disposed between the workpiece or object 26, and the fingers 12, thumb 16 and palm 20. In one aspect, the fingers 12, the thumb 16 and/or the palm 20 can be separated from the workpiece or object 26 by the jamming conformal areas or pads 24.

In one aspect, a separate and distinct jamming conformal area or pad 24 can be disposed on each component, or finger 12, thumb 16 and palm 20, of the end-effector 8. For example, a palm pad 46 can be disposed on the palm 20, a thumb pad 48 can be disposed on the thumb 16, and finger pads 50 can be disposed on the fingers 12. In another aspect, separate and discrete jamming conformal areas or pads 24 can be disposed on each segment 38 of the finger 12 and the thumb 16. For example, a proximal pad 24a can be disposed on the proximal segment 38a, an intermediate pad 24c can be disposed on the intermediate segment 38c, and a distal pad 24b can be disposed on the distal free segment 38a. In another aspect, separate and discrete jamming conformal areas or pads 46 can be disposed on the palm 20. In another aspect, the end-effector 8 can have only certain jamming conformal areas or pads 24. For example, the end-effector 8 may only have distal or fingertip pads 24b on the distal free ends of the fingers 12 and the thumb 16. As another example, the end-effector 8 may have distal pads 24b on the distal free ends of the fingers 12 and the thumb 16, and the palm pad 46 on the palm 20. The separate and discrete jamming conformal areas or pads 24 can form different zones.

Figure 2A:
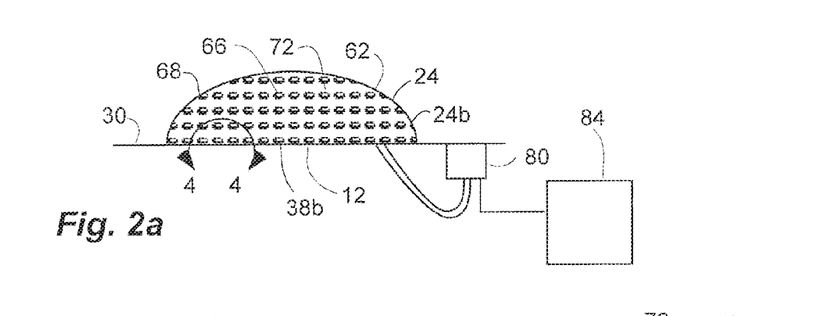
FIG. 2a is a schematic cross-sectional side view of the jamming conformal pad of FIG. 1a shown in a non-contacting, compliant configuration.
Figures 3A, 6, 7, 8, 9:
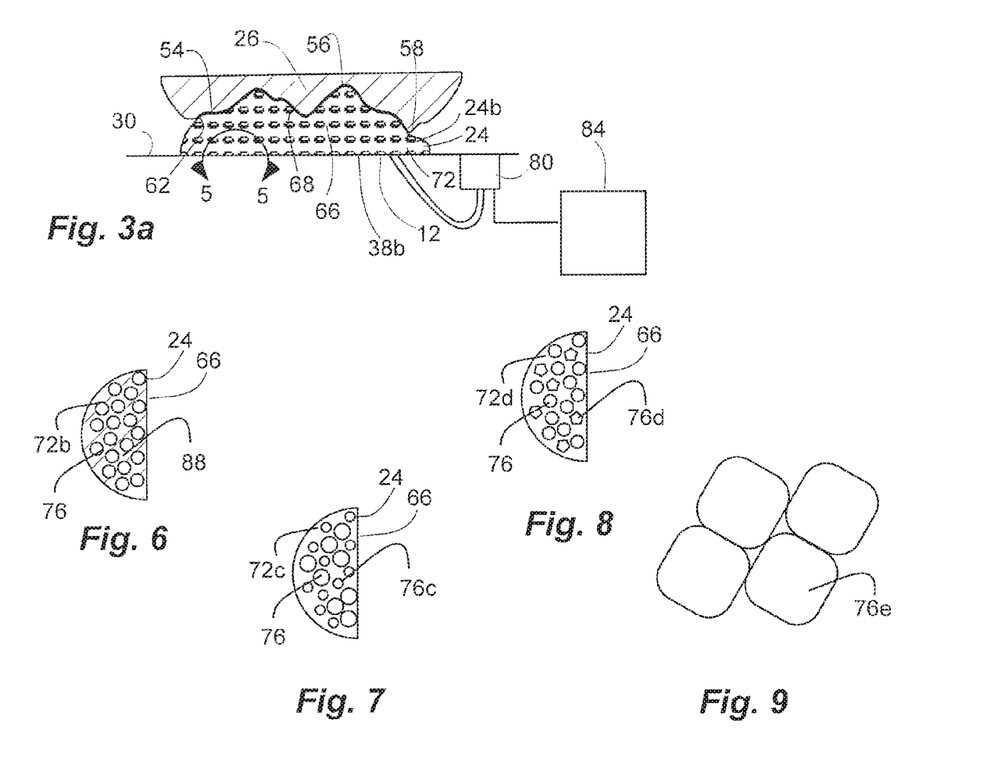
FIG. 3a is a schematic cross-sectional side view of the jamming conformal pad of FIG. 1a shown in a contacting, stiff configuration with the object.
FIG. 6 is a detailed schematic side view of a filler of a jamming conformal pad in one example, showing an interstitial material, namely a liquid, in interstices between the particles.
FIG. 7 is a detailed schematic side view of a filler of a jamming conformal pad in one example, showing particles having different sizes.
FIG. 8 is a detailed schematic side view of a filler of a jamming conformal pad in one example, showing particles having different shapes.
FIG. 9 is a detailed schematic side view of a filler of a jamming conformal pad in one example, showing a compressibility of the particles.

FIG. 2a depicts a jamming conformal area or pad 24 in a compliant configuration, while FIG. 3a depicts the jamming conformal area or pad 24 in a stiff configuration and in contact or engagement with the workpiece or object 26. Similarly, FIG. 2b depicts the jamming conformal area or pad 24 in the compliant configuration prior to contact or engagement with the workpiece or object 26, while FIG. 3b depicts the jamming conformal area or pad 24 in the stiff configuration absent the workpiece or object 26, of after releasing the workpiece or object 26. In FIGS. 2a-3b, the jamming conformal area or pad 24 is represented by the distal pad 24b, while the segments 38 of the fingers 12, thumb 16 and palm 20 are represented by the distal free segment 38b. The workpiece or object 26 can have a surface 54. In one aspect, the surface 54 can comprise a contoured surface with indentations 56 and/or protrusions 58. In one aspect, the surface 54 of the workpiece or object 26 can be irregular and/or asymmetric. In another aspect, the surface 54 of the workpiece or object 26 can be regular and/or symmetric, but can have a discontinuous surface configuration with the indentations 56 and/or protrusions 58. The jamming conformal area or pad 24 or 24b can be compliant to distribute across the surface 54 of the workpiece or object 26. In the event the surface 54 is contoured with one or more variations (indentations 56 and protrusions 58) from flat, the jamming conformal area or pad 24 or 24b can distribute across the surface 54 and infiltrate into the indentations 56 in the surface 54 (similar to how the fingers and palm of a human hand conform at least to some degree). The resulting contour or shape of the jamming conformal area or pad 24 or 24b can define a conformal engaging surface 62 (FIG. 3b) that is operable to match and mate with the surface 54 of the workpiece or object 26. In the compliant configuration, the jamming conformal area or pad 24 or 24b can be compliant, conformal, flexible and susceptible to manipulation or movement or modification in which a shape of the jamming conformal pad is changeable in response to engagement of the jamming conformal area or pad with the surface of an object. The shape of the jamming conformal pad can be changed to achieve a plurality of different engaged shapes depending upon the object or objects to be grasped. In one aspect, the jamming conformal area or pad 24 or 24b can be free, relaxed and/or un-energized in the compliant configuration in order to allow the jamming conformal area or pad to be caused to at least partially, and in some cases fully, conform to a surface of an object. This is advantageous over prior end effectors that just rely on point or line contact and associated loads because by at least partially conforming to a surface of an object, the jamming conformal areas or pads can achieve area contact (contact about an area of an object rather than just a point or line), and can exert and facilitate multi-directional distributed forces within the area contact, as well as area wide opposing forces between the surface and the end-effector 8, with its associated fingers 12, thumb 16 and/or palm 20. These all function to increase the static and kinetic coefficient of friction between the object and the end effector 8, and these functions are similar to that those that occur between the human hand and the surface of a grasped object.

In one aspect, the jamming conformal area or pad 24 or 24b can be active or dynamic, or can be or can comprise and an active or dynamic pad or surface, and can be capable of changing character, state and/or responsiveness, such as compliant characteristics between compliant and stiff. Thus, the jamming conformal area or pad 24 and 24b can selectively alternate between configurations or states, such as compliant and stiff configurations, as well as achieve states in between these. In addition, the jamming conformal area or pad 24 or 24b can alternately change and maintain the a shape, such as an engaged shape (due to interaction with an object) or a shape achieved without engaging an object. In the event the end effector 8 is used to grasp an object, the resulting engaged shape and contour of the conformal engaging surface 62 can be maintained with the jamming conformal area or pad in the stiff configuration. In the stiff configuration, the jamming conformal area or pad 24 or 24b is stiff or relatively stiff compared to the compliant configuration. In addition, in the stiff configuration, the jamming conformal area or pad 24 or 24b can substantially maintain any engaged shape and contour of the jamming conformal area or pad 24 or 24b and its corresponding conformal engaging surface 62. Thus, in the stiff configuration, the jamming conformal area or pad 24 or 24b, and/or the conformal engaging surface 62, becomes substantially rigid or solid. In one aspect, the shape or contour of the conformal engaging surface 62 and the jamming conformal area or pad 24 or 24b are controllable and active, as opposed to being passive. In the stiff configuration, the conformal engaging surface 62 has substantially the same shape and/or contour as the surface 54 (be it contoured, flat, or a combination of these) of the workpiece or object 26, even if the workpiece or object 26 is removed, as shown in FIG. 3b. In the stiff configuration, the jamming conformal area or pad 24 or 24b can be energized, and is capable of actively maintaining the shape and/or contour of the conformal engaging surface 62. Thus, the jamming conformal area or pad 24 or 24b, and the conformal engaging surface 62, can be adaptive to the surface 54 of the workpiece or object 26, and can distribute forces over an area, and can extend into indentations 56 for a better grip, which are just some of the advantages provided. This can result in less slippage between the end effector 8 and the object, and can further facilitate a reduction in the amount of forces needed in the end effector 8 to both grasp and hold an object, particularly as compared with prior end effectors having only rigid gripping, palm or other surfaces intended to interact with objects that rely on point or line contact and associated loads.

In one aspect, the jamming conformal area or pad 24 or 24b can be binary, and can have only the two compliant and stiff configurations. In another aspect, the jamming conformal area 24 or 24b can be analog, and can have multiple varying degrees of stiffness between the compliant and stiff configurations, as described in greater detail below.

In one aspect, the jamming conformal areas or pads 24 can be operated collectively. Thus, each jamming conformal area or pad 24 can share a common state or configuration, such as all being compliant or all being stiff. Similarly, all may share a similar degree of stiffness or compliance. In another aspect, the jamming conformal areas or pads 24 can be operated independently with respect to one another. Thus, one jamming conformal area or pad 24 may be compliant while another jamming conformal area or pad 24 may be stiff. In addition, different jamming conformal areas or pads 24 may have different degrees of compliance or stiffness.

Although the jamming conformal area or pad 24 or 24b has been described above as being relaxed in the compliant configuration and energized or active in the stiff configuration, the jamming conformal area or pad 24 or 24b can be configured to be relaxed or un-energized in the stiff configuration, and energized in the compliant configuration.

In one aspect, the jamming conformal area or pad 24 or 24*b* comprises a bladder 66 on the inner portion 30 of the finger 12, thumb 16 or palm 20. The bladder 66 can have an exterior membrane 68 conformable to the surface 54 of the workpiece or object 26, and forming the conformal engaging surface 62. The bladder 66 can contain a filler 72 disposed in and flowable in the bladder 66. Thus, the filler 72 is behind the membrane 68 and between the membrane 68 and the inner portion 30 of the finger 12, thumb 16 or palm 20. In another aspect, the filler 72 can comprise particles 76. The filler 72 can have at least two configurations, including a flowable configuration, as shown in FIGS. 2*a* and 2*b*, and a static configuration, as shown in FIGS. 3*a* and 3*b*. The flowable configuration corresponds to the compliant configuration of the jamming conformal area or pad 24. In the flowable configuration, the filler 72 flows as the exterior membrane 68 and bladder 66 conform to the surface 54. The static configuration corresponds to the stiff configuration of the jamming conformal area or pad 24. In the static configuration, the filler 72 is static or relatively static with respect to the flowable configuration, and resists flow of the filler 72. In another aspect, a flow characteristic of the filler 72 varies with pressure within the bladder 66. Thus, compliance of the bladder 66, and the membrane 68 and the conformal engaging surface 62, varies with the flow characteristics of the filler 72.

The bladder 66 can be flexible and resilient, or elastic, and can be formed of any flexible and resilient, or elastic, material suitable for the purposes and functions described herein, and as will be recognized by those skilled in the art. For example, and not intending to be limiting in any way, the bladder 66 can be formed of elastomers, such as natural rubber, silicone, neoprene, nitrile, butyl, and others; flexible/stretchy polymers, such as polyethylene, polypropylene, vinyl, and others. Thus, the bladder 66 can be formed of a material that facilitates, and can comprise, a volume that is changeable. For instance, the bladder 66 can be configured to collapse a given degree under a corresponding given pressure, and can have a volume that is changeable. In addition, the bladder 66 can be configured to change shape and position as the bladder 66 or membrane 68 contacts the surface 54 of the workpiece or object 26. In one aspect, the bladder 66 can be formed of a single material, a laminate, or a reinforced material. The bladder 6 can be sealed with respect to the surrounding environment, and can be hermetically sealed. The bladder 66 can have an interior or hollow, and can define a pocket. In one aspect, the bladder 66 can be formed of a pair of layers sealed around a perimeter. An inner layer can be substantially and/or relatively flat, while an exterior layer can be substantially and/or relatively convex to create the hollow. The inner layer of the bladder 66 can be coupled or otherwise secured to the finger 12, thumb 16 and/or palm 20 of the end-effector 8. An inner surface of the inner layer can be coupled or otherwise secured to the end-effector 8 such that a majority, or substantially all, of the inner surface is coupled or secured to the end-effector 8, or the inner portion 30 thereof. In another aspect, a perimeter of the inner layer can extend beyond the seal to form a flange or tabs that can be coupled or otherwise secured to the end-effector 8. The bladder 6 can be attached or coupled or otherwise secured to the finger 12, thumb 16 and/or palm 20 using adhesives, fasteners and seals, and any other means or methods of attachment. The bladder can be attached or otherwise supported by the end effector via being molded and adhered to the surface, or it can form the outer wall, with the gripper surface being the other side, and in which case the bladder can have its free edge clamped in such a way as to seal it and create a sealed volume.

A filler 72 can be disposed in the bladder 66, and can be flowable or otherwise movable in the bladder 66. By flowable, it is meant that the particles 76 can move relative to one another. In one example, the filler 72 can comprise particles 76 that can flow and move with respect to one another, and that can bear against one another. In one aspect, the particles 76 can substantially fill the bladder 66 in a loose manner, and can occupy a majority of the hollow of the bladder 66 or volume thereof. The filler 72 flows, and the particles 76 move with respect to one another, within the bladder 66 as the bladder and the hollow or interior volume changes shape and position due to contact or engagement of the bladder 66 with the surface 54 of the workpiece of object 26, and any contours or variations within the surface 54. In one aspect, the filler 72 can further comprise a gas, such as air, filling interstices between the particles 76. Essentially, the filler 72 can be contained within and caused to be flowable in the bladder 66, the filler 72 comprising particles 76, wherein a flow characteristic of the filler 72 varies with pressure within the bladder 66, and resistance to movement of the bladder 66, the membrane 68 an the conformal engaging surface 62, varies with the flow characteristics of the filler 72. In addition, the stiffness of the bladder 66 or membrane 68 can be characterized as being the increase in interaction forces between the particles 76 of the filler 72.

Furthermore, a pressure source 80 can be operatively coupled to the bladder 66 (e.g., operable to induce a pressure within or about the bladder 66), and capable of varying a pressure within the bladder 66. In one aspect, the pressure source 80 can comprise a vacuum source configured to selectively withdraw an interstitial material or fluid, such as gas or air, from the bladder 66. For example, the vacuum source can be a vacuum pump, such as a piston moveable within a cylinder. As the pressure changes within the bladder 66, the bladder 66 collapses, thus causing the flow characteristics of the filler material 72 and the particles 76 to vary. By collapse it is meant that the bladder 66 collapses or reduces in volume at least some degree from its fully expanded state or condition. As the bladder 66 changes volume, the contact and/or interference between the particles 76 of the filler 72 is increased. As the flow characteristics of the filler 72 and particles 76 vary, a compliance of the bladder 66, with the filler 72 therein, reduces and thus the compliance of the bladder 66, the membrane 68 and the conformal engaging surface 62, varies. Thus, the pressure source 80 or vacuum source can be selectively varied to selectively vary the stiffness or compliance of the bladder 66. In one aspect, the stiffness or compliance of the jamming conformal areas or pads 24 and the bladder 66 can be selectively varied through a continuous range of resistance between soft and rigid. The stiffness or compliance can be adjusted dynamically to be essentially soft or fluid all the way to completely stiff or rigid, and any state in between. The pressure source 80 is capable of providing a variable degree/range of pressure within the bladder 66 to provide a variable degree/range of stiffness or compliance of the bladder 66 with the filler 72. The pressure source 80 is capable of varying pressure within the bladder 66 to provide compliance facilitating free movement of the membrane 68 or conformal engaging surface 62, and stiffness or limited movement of the membrane 68 or conformal engaging surface 62. In another aspect, and although not shown, one skilled in the art will recognize that rather than varying the pressure source 80, the pressure source 80 can be operable with one or more valves in fluid communication with the pressure source 80 and the bladder 66, where the valves are controllable to vary the pressure within the bladder 66.

Figure 4:
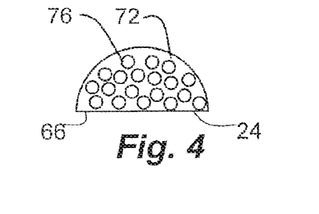
FIG. 4 is a detailed schematic side view of the jamming conformal pad of FIG. 1a taken along line 4 of FIG. 2a, showing particles of a filler in a flowable configuration.
Figure 5:
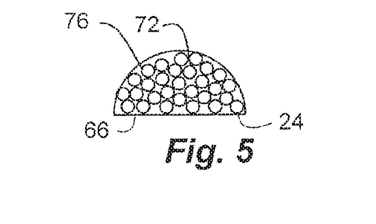
FIG. 5 is a detailed schematic side view of the jamming conformal pad of FIG. 1a taken along line 5 of FIG. 3a, showing particles of the filler in a static configuration.

FIG. 4 depicts a detailed schematic side view of the bladder 66 or jamming conformal area or pad 24 taken along line 4 of FIG. 2a, while FIG. 5 is a detailed schematic side view of the bladder 66 or jamming conformal area or pad 24 taken along line 5 of FIG. 3a. FIG. 4 depicts the particles 76 of the filler 72 in the relaxed, flowable or conformal configuration of the bladder 66 or pad 24 corresponding to a relatively larger pressure, such as ambient pressure, within the bladder 66. The particles 76 can flow and move relative to one another, and while in contact one another, are not brought to bear against one another with any significant frictional force. Thus, the bladder 66 or conformal engaging surface can be relatively free to move with respect to the workpiece or object, and experience very little or nominal resistance from the bladder 66. On the other hand, FIG. 5 depicts the particles 76 of the filler 72 in the static or stiff configuration of the bladder 66 or pad 24 corresponding to a relatively lower pressure, with respect to the larger pressure or ambient pressure. In this case, the bladder 66 has been caused to collapse on the filler 72, and thus the particles 76 are brought to bear against one another, and interfere with one another to restrict flow. Thus, the bladder 66 or conformal engaging surface can have relatively restricted movement, and can experience relatively larger resistance from the bladder 66. The particles 76 can be relatively loose under greater pressure, as shown in FIG. 4, and can flow easily with respect to one another; but the particles 76 can be relatively compacted under less pressure, as shown in FIG. 5, and can have difficulty flowing with respect to one another. Compacting the particles 76 can result in greater physical impediment to flow, and greater friction between the particles. As the pressure source 80 or vacuum reduces pressure within the bladder 66, the bladder 6 collapses and compacts the particles 76 of the filler 72, thus impeding the flow of the particles 76 and stiffening the jamming conformal area or pad 24. Essentially, with reduced pressure, the particles 76 are forced together, thus increasing the kinetic coefficient of friction between them. The magnitude of the kinetic coefficient of friction can be varied by varying the pressure induced by the collapse of the bladder 66 and the resulting compaction of the particles 76.

Referring again to FIGS. 2a and 3a, the end-effector can further comprise one or more sensors and a controller 84. The sensors can sense a characteristic of the jamming conformal area or pad 24, or the bladder 66, such as pressure in the bladder 66. In one example, a pressure sensor can be operatively coupled to the bladder 66, such as the bladder itself, the pressure source 80, or a pressure line between the bladder and the pressure source. The pressure sensor can be capable of providing feedback to the pressure source 80 and/or the controller 84. Thus, the stiffness can be varied based on a pressure of the bladder 66. The controller 84 can be operatively coupled to the pressure source 80 (or alternatively one or more valves) to control the pressure source to selectively vary the pressure within the bladder 66. In another aspect, a force sensor can be used. In another aspect, pressure force and position sensors can be used. In another aspect, the controller 84 and the pressure source 80 can be used to vary the pressure within multiple bladders (e.g., via a bus arrangement in which a plurality of pressure lines (or branches of pressure lines) between the pressure source and the plurality of bladders are used).

FIG. 6 depicts a detailed schematic side view of filler 72b of a jamming conformal area or pad 24, or bladder 66, showing an interstitial material 88 in interstices between the particles 76. In one aspect, the interstitial material 88 can comprise a liquid, such as oil to facilitate flow of the particles 76. In one aspect, the interstitial material 88 can be non-compressible. In one aspect, the interstitial material 88 can fill the interstices between the particles 76, and can substantially fill the bladder 66. In another aspect, the interstitial material 88 can substantially coat the particles 76, defining coated particles, while of majority of the interstices between the particles 76 remains a gas. Thus, the interstitial material 88 can comprise a fluid, such as a liquid or a gas.

FIG. 7 depicts a detailed schematic side view of filler 72c of a jamming conformal area or pad 24, or bladder 66, showing particles having different sizes. The particles 76 and 76c of the filler 72c can comprises at least two different sizes of particles, and in some examples three, four or more different sizes. In one aspect, smaller particles 76c can be disposed in the interstices between the larger particles 76. In one aspect, the particles 76 and 76c can be formed of different materials, and can have different characteristics, such as different coefficients of friction, different compressibility, etc. Those skilled in the art will recognize that the size, configuration, material makeup or type, etc. and relative quantities of the particles 76 and 76c can be selected to obtain desired flow characteristics, and to tune the resistance characteristics of the jamming conformal area or pad 24, or bladder 66. Indeed, it is contemplated that the jamming conformal area or pad 24, or bladder 66, discussed herein can be tuned as needed or desired.

FIG. 8 depicts a detailed schematic side view of filler 72d of a jamming conformal area or pad 34, or bladder 66, showing particles 76 and 76d having different shapes. The particles of the filler 72d can comprise at least two different shapes of particles, and in some examples three, four or more different shapes or configurations. In one aspect, some of the particles 76 can be spherical, semi-spherical, or partially spherical (meaning substantially spherical while not a perfect sphere) while other particles 76d can have flat surfaces. In another example, the shapes or configuration of the particles 76d can be random. The particles 76 and 76d can have different characteristics due to their respective shapes that can change the flow characteristics. The shapes of the particles 76 and 76d can be selected to obtain desired flow characteristics, and to tune the resistance characteristics of the jamming conformal area or pad 24, or bladder 66.

FIG. 9 depicts a detailed schematic side view of particles of a filler of a jamming conformal area or pad, or bladder, showing a compressibility of the particles 76e. In one aspect, the particles 76e of the filler can be elastically compressible, as shown. In another aspect, the particles can be relatively rigid. The particles 76e of the filler can have an elastic modulus, which is a measure of elastic deformation in response to an applied load, and/or a yield strength, which is the onset of plastic deformation at a given stress level. In one aspect, the particles can comprise rubber, which essentially does not have a yield strength, but rather elastically deforms until it fractures. In one aspect, the particles of the filler can have a relatively low modulus (Young's Modulus of Elasticity), such as 0.01-3.5 GPa, and can comprise a polymer, such as rubber (Young's Modulus of 0.01-0.1 GPa or $1.45\text{-}14.5 \times 10^{-3}$ Mpsi), Acrylonitrile Butadiene Styrene (ABS) (Young's Modulus of 1.4-1.3 GPa or 2.3 GPa), nylon (Young's Modulus of 2-4 GPa or 0.29-0.58 Mpsi; yield strength of 45 MPa), low-density polyethylene (Young's Modulus of 0.11-0.86 GPa or $1.6\text{-}6.5 \times 10^{-3}$ Mpsi), high-density polyethylene (Young's Modulus of 0.8 GPa or 0.116 Mpsi), polypropylene (Young's Modulus of 1.5-2 GPa or 0.22-0.29 Mpsi), polyimide (Young's Modulus of 2.5 GPa), polystyrene (Young's Modulus of 3-3.5 GPa or 0.44-0.51 Mpsi), etc. In another aspect, the particles of the filler can have a relatively high modulus, such as 50-100 GPa, and can comprise sand (7-80 MPa), aluminum (Young's Modulus of 69 GPa or 10 Mpsi; yield strength of 95 MPa), glass (Young's Modulus of 50-90 GPa or 7.25-13.1 Mpsi), etc. In one aspect, the particle of the filler can be light-weight materials to facilitate mobility. In another aspect, the moduli of the material can be selected based on material properties temperature ranges of interest. In another aspect, the particles of the filler can have at least two different moduli.

Figure 10:
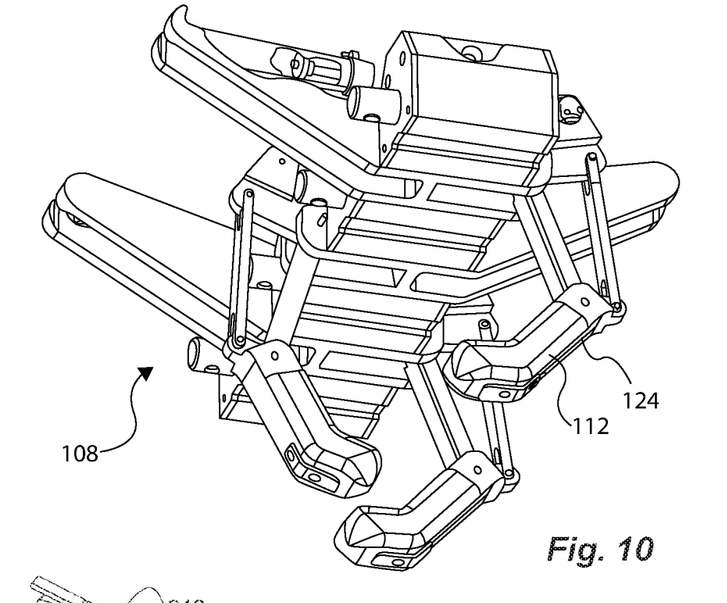
FIG. 10 is a perspective view of another end-effector, namely a hybrid magnetic and finger gripper, with jamming conformal pads in accordance with an example.

FIG. 10 depicts another example of an end-effector 108, namely a hybrid magnetic and finger gripper, with jamming conformal areas or pads 124, or bladders, which is similar in most respects to that described above, and which description is hereby incorporated herein where applicable, as will be recognized by those skilled in the art. The end-effector 108 can have opposing fingers 112 that can have an obtuse angle between adjacent or contiguous segments. Thus, corresponding jamming conformal areas or pads 124 can match the obtuse angle of the fingers 112. The jamming conformal areas or pads 124 can have a substantially constant thickness from the fingers 112 outwardly along the segments, and even while spanning the apex between the segments. In another aspect, different and/or multiple jamming conformal areas or pads can be disposed on each linear segment of the fingers.

Figure 11:
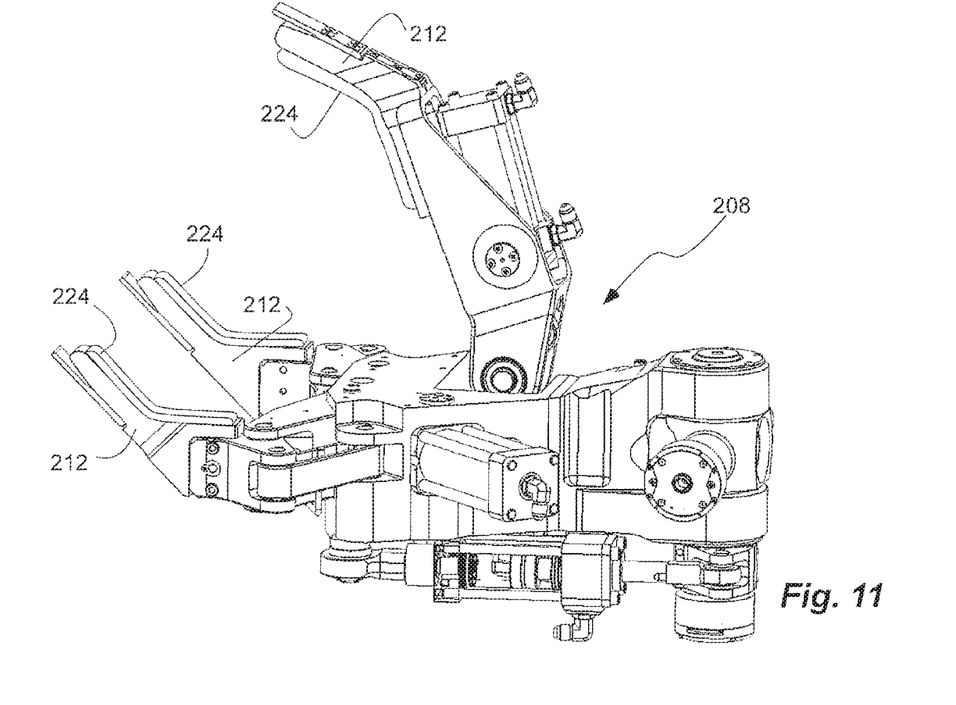
FIG. 11 is a perspective view of another end-effector, namely a morph hand, with jamming conformal pads in accordance with an example.

FIG. 11 depicts another example of an end-effector 208, namely a morph hand, with jamming conformal areas or pads 224, or bladders, which is similar in most respects to those described above, and which descriptions are hereby incorporated herein where applicable, as will be recognized by those skilled in the art. The end-effector 208 can have opposing fingers 212 that can have an obtuse angle between adjacent or contiguous segments. Thus, corresponding jamming conformal areas or pads 224 can match the obtuse angle of the fingers 212. The fingers 212, and thus the jamming conformal areas or pads 224, can be long and slender, such as a length along the finger much greater than a width of the finger. In another aspect, different and/or multiple jamming conformal areas or pads can be disposed on each segment of the fingers.

Figure 12A:
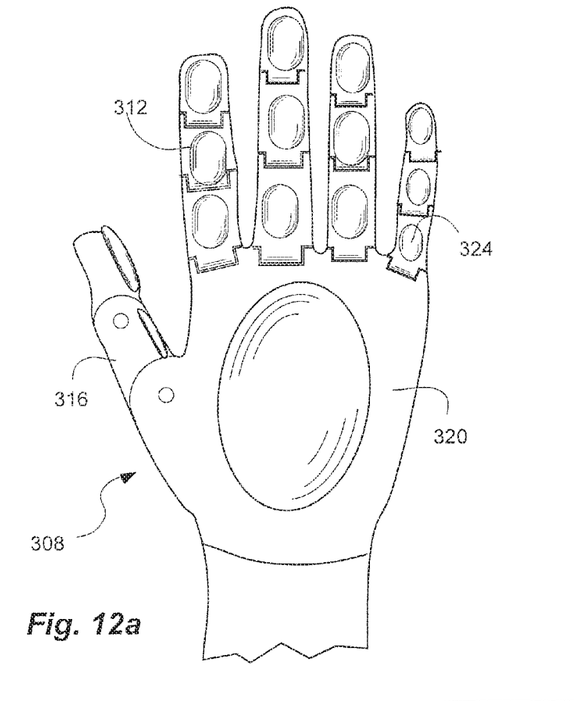
FIG. 12a is a front view of another end-effector, namely a plate or anthropomorphic hand, with jamming conformal pads in accordance with an example.
Figure 12B:
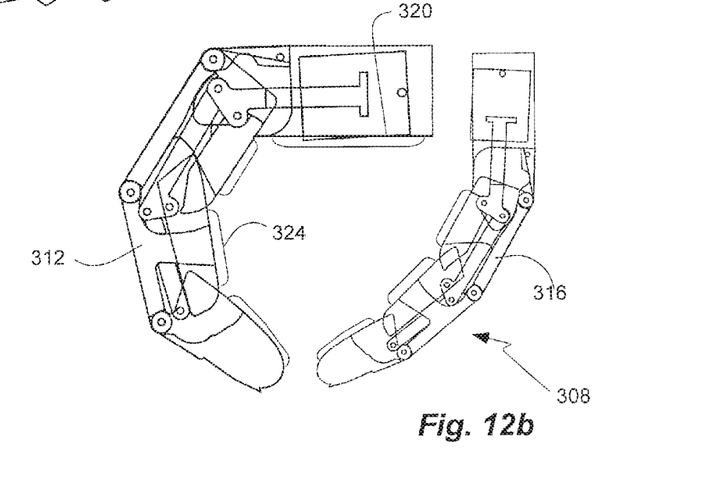

FIGS. 12a and 12b depict another example of an end-effector 308, namely a plate or anthropomorphic hand, with jamming conformal areas or pads 324, or bladders, which is similar in most respects to those described above, and which descriptions are hereby incorporated herein where applicable, as will be recognized by those skilled in the art. The end-effector 308 can have four fingers 312, an opposable thumb 316 and a palm 320. In one aspect, separate and discrete jamming conformal areas or pads 324 can be disposed on each segment of the finger 312 and the thumb 315 and the palm 320.

Figure 13:
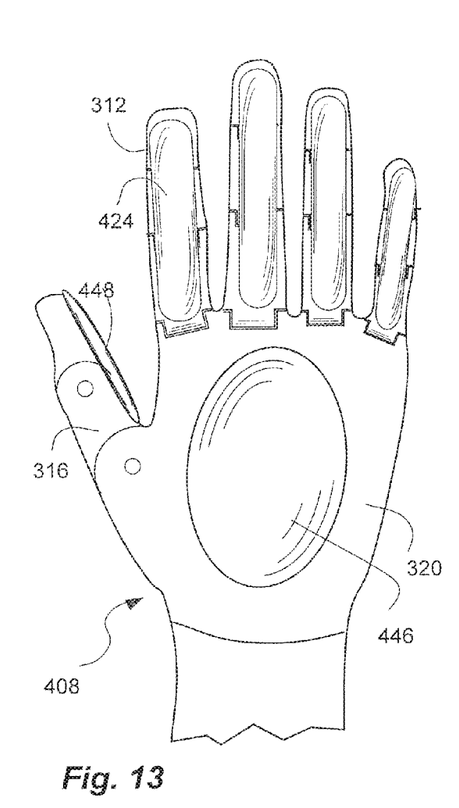
FIG. 13 is a front view of another end-effector, namely a plate or anthropomorphic hand, with jamming conformal pads in accordance with an example.

FIG. 13 depicts another example of an end-effector 408, namely a plate or anthropomorphic hand, with jamming conformal areas or pads 424, or bladders, which is similar in most respects to those described above, and which descriptions are hereby incorporated herein where applicable, as will be recognized by those skilled in the art. The end-effector can have four fingers 312, an opposable thumb 316 and a palm 320. In one aspect, a separate and distinct jamming conformal area or pad 424 can be disposed on each component, or finger 312 and thumb 316, and the palm 320 of the end-effector. For example, a palm pad 446 can be disposed on the palm 320, a thumb pad 448 can be disposed on the thumb 316, and finger pads 424 can be disposed on the fingers 312. Thus, the jamming conformal area or pad 424 can be a single jamming conformal area or pad disposed on the articulated finger 312 and spanning the series of segments and intermediate joints.

Figure 14A:
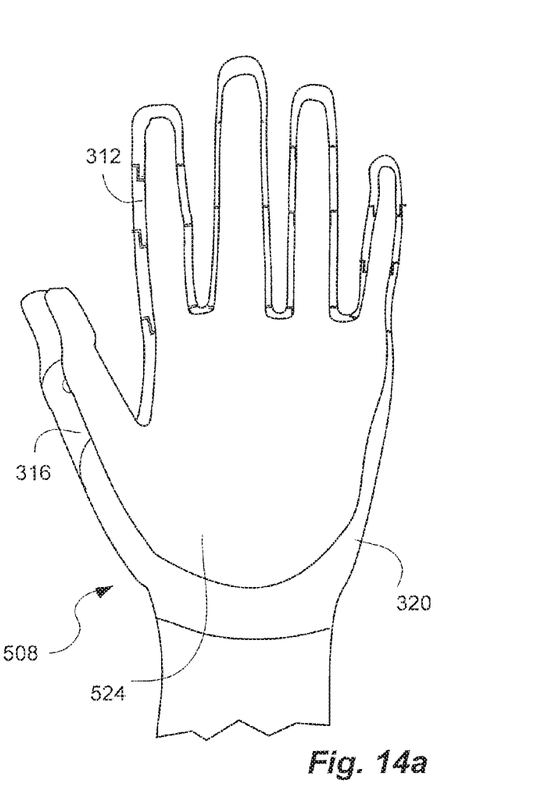
FIG. 14a is a front view of another end-effector, namely a plate or anthropomorphic hand, with jamming conformal pads in accordance with an example.
Figure 14B:
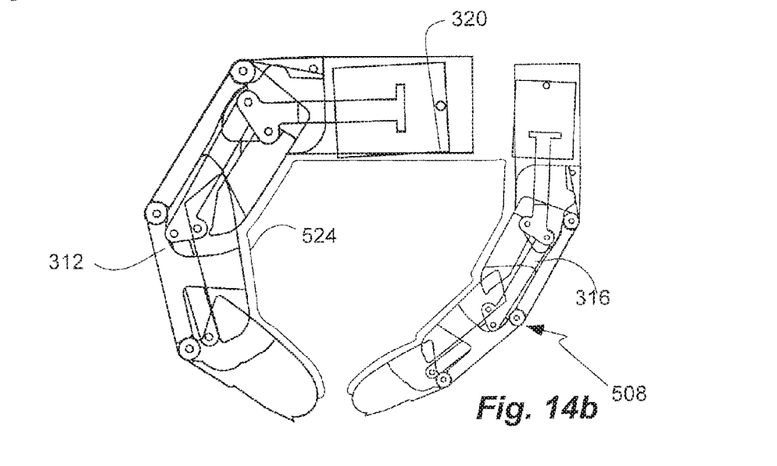

FIGS. 14a and 14b depict another example of an end-effector 508, namely a plate or anthropomorphic hand, with a jamming conformal area or pad 524, or bladder, which is similar in most respects to those described above, and which descriptions are hereby incorporated herein where applicable, as will be recognized by those skilled in the art. The end-effector 508 can have four fingers 312, an opposable thumb 316 and a palm 320. In one aspect, a single jamming conformal area or pad 524 can be disposed on the end-effector 508, and can extend along each segment of the finger 312 and the thumb 316, and between the palm 320 and the fingers 312 and thumb 316. Thus, the jamming conformal area is a single jamming conformal area or pad 524 spanning the palm 320, the four fingers 312 and the thumb 316.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A robotic end-effector configured to provide conformal object interaction, comprising:
    a plurality of fingers, each having an inner portion and one or more degrees of freedom;
    at least one jamming conformal pad disposed on the inner portion of a corresponding finger of the plurality of fingers, wherein each of the jamming conformal pads is operable in at least two pad configurations, the at least two pad configurations comprising:
        a compliant configuration in which a shape of the jamming conformal pad is changeable to achieve an engaged shape in response to engagement of the pad with the surface of an object; and
        a stiff configuration in which the jamming conformal pad maintains the engaged shape, and is relatively stiff compared to the jamming conformal pad in the compliant configuration;
    at least one pressure source operatively coupled to the jamming conformal pads, the at least one pressure source being configured to vary the pressure within the jamming conformal pads;
    a controller operatively coupled to the at least one pressure source; and
    a pressure sensor operable with each jamming conformal pad, each pressure sensor being operable with the controller to provide feedback to the controller, wherein the controller independently and selectively varies the pressure in each of the jamming conformal pads based on the feedback from each pressure sensor, wherein the at least one jamming conformal pad comprises:
        a bladder comprising a pair of layers sealed around a perimeter, the layers comprising an inner layer and an exterior layer, the inner layer being substantially flat and the exterior layer being convex to create a hollow; and
        a filler within and flowable in the bladder, the filler comprising particles and an interstitial material disposed in interstices between the particles.

2. The robotic end-effector of claim 1, wherein a perimeter of the inner layer can extend beyond a coupled portion of the inner layer.

3. The robotic end-effector of claim 1, wherein the jamming conformal pads are operable to distribute across the surface of the object and infiltrate into any indentations in the surface, defining a conformal engaging surface configured to match and mate with the surface of the object, and wherein the jamming conformal pads comprise an active area capable of changing compliant characteristics to alternately change and maintain a contour of the conformal engaging surface.

4. The robotic end-effector of claim 3, wherein the conformal engaging surface is an active surface capable of alternately changing and maintaining a contour.

5. The robotic end-effector of claim 3, wherein the bladder comprises:
    an exterior membrane conformable to the surface of the object and defining the conformal engaging surface, wherein the filler is behind the exterior membrane and between the exterior membrane and the inner portion of the at least one finger, the filler having at least two configurations, the configurations comprising:
        a flowable configuration, corresponding to the compliant configuration of the jamming conformal pad, in which the filler flows as the exterior membrane conforms to the surface; and
        a static configuration, corresponding to the stiff configuration of the jamming conformal pad, in which the filler is static as compared to the filler in the flowable configuration, and which resists flow of the filler.

6. The robotic end-effector of claim 1, wherein the jamming conformal pads are analog and has multiple varying degrees of stiffness between the compliant and stiff configurations.

7. The robotic end-effector of claim 1, wherein the fingers further comprise:
    a pair of opposing articulated fingers opposing one another across a gap.

8. The robotic end-effector of claim 7, wherein each articulated finger further comprises:
    a series of segments with adjacent segments movably coupled together at a joint, and having at least a proximal segment and a distal free segment; and
    the jamming conformal pad being located on at least the distal free segment of the articulated finger.

9. The robotic end-effector of claim 8, wherein the jamming conformal pad is disposed on each segment of the articulated finger.

10. The robotic end-effector of claim 9, wherein the jamming conformal pad is a single jamming conformal pad disposed on the articulated finger and spanning the series of segments and intermediate joints.

11. The robotic end-effector of claim 9, wherein the jamming conformal pad comprises a series of separate and discrete jamming conformal pads each supported by a respective segment of the series of segments.

12. The robotic end-effector of claim 1, further comprising:
    an anthropomorphic hand comprising a palm, the fingers including a first finger and a thumb extending from the palm, the thumb opposing the first finger.

13. The robotic end-effector of claim 12, wherein the at least one jamming conformal pad comprises a palm jamming conformal pad that is disposed on the palm.

14. The robotic end-effector of claim 12, wherein the anthropomorphic hand comprises a plurality of fingers extending from the palm and opposing the thumb.

15. The robotic end-effector of claim 1, wherein
    a flow characteristic of the filler varies with pressure within the bladder, and compliance of the bladder varies with the flow characteristics of the filler.

16. The robotic end-effector of claim 15, wherein a volume of the bladder varies as a function of pressure within the bladder.

17. The robotic end-effector of claim 15, wherein the pressure source is operatively coupled to the bladder and capable of varying the pressure within the bladder.

18. The robotic end-effector of claim 17, wherein the pressure source is operable to provide a variable range of pressures within the bladder to provide a variable degree of stiffness to the jamming conformal pads.

19. The robotic end-effector of claim 17, wherein the pressure source is capable of varying pressure within the bladder to provide stiffness to the jamming conformal area between, and including, a soft and a rigid jamming conformal pad.

20. The robotic end-effector of claim 17, wherein the pressure source comprises a vacuum source for selectively withdrawing the interstitial material from the bladder.

21. The robotic end-effector of claim 15, wherein the bladder is flexible and has a volume that is changeable.

22. The robotic end-effector of claim 15, wherein the bladder changes shape upon contact with the object; and wherein the filler flows, and the particles move with respect to one another, within the bladder as the bladder changes shape.

23. The robotic end-effector of claim 15, wherein the particles of the filler are elastically compressible.

24. The robotic end-effector of claim 15, wherein the particles of the filler have an elastic modulus between 0.01-3.5 GPa.

25. The robotic end-effector of claim 15, wherein the particles of the filler have an elastic modulus between 50-100 GPa.

26. The robotic end-effector of claim 15, wherein the particles of the filler have at least two different elastic moduli.

27. The robotic end-effector of claim 15, wherein the particles of the filler further comprises at least two different sizes of particles.

28. The robotic end-effector of claim 15, wherein the particles of the filler are at least partially spherical.

29. The robotic end-effector of claim 15, wherein the particles of the filler comprise at least two different shapes of particles.

30. The robotic end-effector of claim 1, wherein the interstitial material comprises a non-compressible liquid.

31. The robotic end effector of claim 1, wherein the interstitial material comprises oil.

32. A robotic end-effector configured to provide conformal object interaction, comprising:
a pair of opposable fingers opposing one another across a gap, the pair of opposable fingers being movable with respect to one another to vary a size of the gap, the pair of opposable fingers each having an inner portion and one or more degrees of freedom;
a bladder on the inner portion of each finger of the pair of opposable fingers, the bladder comprising a pair of layers sealed around a perimeter, the layers comprising an inner layer and an exterior layer, the inner layer being substantially flat and the exterior layer being convex to create a hollow;
a filler within and flowable in each bladder and comprising particles and an interstitial material disposed in interstices between the particles to facilitate flow of the particles, wherein a flow characteristic of the filler varies with pressure within each bladder, and compliance of the bladders varies with the flow characteristics of the filler;
at least one pressure source operatively coupled to the bladders, the at least one pressure source being configured to vary the pressure within the bladders to vary the flow characteristics of the filler;
a controller operatively coupled to the at least one pressure source; and
a pressure sensor operable with each bladder, each pressure sensor being operable with the controller to provide feedback to the controller, wherein the controller independently and selectively varies the pressure in each of the bladders based on the feedback from each pressure sensor,
each bladder with the filler therein having at least two configurations, comprising:
a compliant configuration in which a shape of the bladder and filler are changeable to achieve an engaged shape in response to engagement of the bladder with a surface of an object; and
a stiff configuration in which the bladder and filler maintains the engaged shape, and is stiff compared to the bladder and filler in the compliant configuration.

33. The robotic end effector of claim 32, wherein, in the compliant configuration, the bladder and filler are operable to distribute across the surface of the object, and infiltrate into indentations in the surface, defining a conformal engaging surface configured to match and mate with the surface.

34. A robotic end-effector configured to provide conformal object interaction, comprising:
a plurality of gripping surfaces;
one or more jamming conformal pads disposed on each gripping surface, wherein each of the one or more jamming conformal pads is operable in at least two pad configurations, the at least two pad configurations comprising:
a compliant configuration in which a shape of the jamming conformal pad is changeable to achieve an engaged shape in response to engagement of the pad with the surface of an object; and
a stiff configuration in which the jamming conformal pad maintains the engaged shape, and is relatively stiff compared to the jamming conformal pad in the compliant configuration; and
at least one pressure source operatively coupled to the one or more jamming conformal pads, the at least one pressure source being configured to vary the pressure within the one or more jamming conformal pads;
a controller operatively coupled to the at least one pressure source; and
a pressure sensor operable with each jamming conformal pad, each pressure sensor being operable with the controller to provide feedback to the controller, wherein the controller independently and selectively varies the pressure in each of the jamming conformal pads based on the feedback from each pressure sensor,
wherein the one or more jamming conformal pads comprise:
a bladder comprising a pair of layers sealed around a perimeter, the layers comprising an inner layer and an exterior layer, the inner layer being substantially flat and the exterior layer being convex to create a hollow; and
a filler within and flowable in the bladder, the filler comprising particles and an interstitial material disposed in interstices between the particles.

35. The robotic end-effector of claim 34, further comprising fingers, each finger having one or more degrees of freedom, wherein the plurality of gripping surfaces are defined by the fingers.

36. The robotic end effector of claim 34, further comprising:
at least one finger, a palm, and a thumb extending from the palm and opposing the at least one finger,
wherein the gripping surfaces are defined by the at least one finger, the palm and the thumb, the jamming conformal pad associated with the at least one finger and the thumb.

37. A method of gripping an object having a surface with a robotic end-effector, the method comprising:
positioning the object in a gap between a pair of opposable fingers of the robotic end-effector;
closing the pair of opposable fingers on the object;
compressing a jamming conformal pad supported by each finger of the pair of opposable fingers against the surface of the object with the jamming conformal pads distributing across the surface of the object and infiltrating into any indentations in the surface to define conformal engaging surfaces of the jamming conformal pads that match and mate with the surface, wherein the jamming conformal pad comprises:
- a bladder comprising a pair of layers sealed around a perimeter, the layers comprising an inner layer and an exterior layer, the inner layer being substantially flat and the exterior layer being convex to create a hollow;
- a filler within and flowable in the bladder, the filler comprising particles and an interstitial material disposed in interstices between the particles;

obtaining a pressure reading from a pressure sensor operable with each jamming conformal pad at a controller that is operable with each pressure sensor; and selectively and independently stiffening each jamming conformal pad to maintain the shape of the conformal engaging surface via the controller controlling at least one pressure source operatively coupled to the jamming conformal pads based on the pressure reading received from each pressure sensor, the at least one pressure source being configured to vary the pressure within the jamming conformal pads.

38. The method of claim 37, wherein positioning the object in the gap further comprises positioning the object against a palm of the robotic end effector, the pair of opposable fingers extending from the palm.

39. The method of claim 38, further comprising compressing a jamming conformal pad supported by the palm against the surface of the object with the jamming conformal pad distributing across the surface of the object and infiltrating into any indentations in the surface to define a conformal engaging surface of the jamming conformal pad of the palm that matches and mates with the surface.

40. The method of claim 39, further comprising stiffening the jamming conformal pad supported by the palm to maintain the shape of the conformal engaging surface of the jamming conformal pad of the palm.

* * * * *